(12) United States Patent
Bhattacharyya et al.

(10) Patent No.: US 11,778,219 B2
(45) Date of Patent: Oct. 3, 2023

(54) METHOD AND SYSTEM FOR LIVE VIDEO STREAMING WITH INTEGRATED ENCODING AND TRANSMISSION SEMANTICS

(71) Applicant: Tata Consultancy Services Limited, Mumbai (IN)

(72) Inventors: Abhijan Bhattacharyya, Kolkata (IN); Ashis Sau, Kolkata (IN); Madhurima Ganguly, Kolkata (IN); Balamuralidhar Purushothaman, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 17/816,464

(22) Filed: Aug. 1, 2022

(65) Prior Publication Data
US 2023/0224486 A1 Jul. 13, 2023

(30) Foreign Application Priority Data
Jan. 11, 2022 (IN) .............................. 202221001608

(51) Int. Cl.
| | |
|---|---|
| H04N 7/12 | (2006.01) |
| H04N 19/46 | (2014.01) |
| H04N 19/167 | (2014.01) |
| H04N 19/85 | (2014.01) |
| H04N 19/14 | (2014.01) |
| H04N 19/127 | (2014.01) |

(Continued)

(52) U.S. Cl.
CPC ........... *H04N 19/46* (2014.11); *H04N 19/127* (2014.11); *H04N 19/14* (2014.11); *H04N 19/167* (2014.11); *H04N 19/188* (2014.11); *H04N 19/189* (2014.11); *H04N 19/85* (2014.11)

(58) Field of Classification Search
CPC ... H04N 19/127; H04N 19/188; H04N 19/189
See application file for complete search history.

(56) References Cited

U.S. PATENT DOCUMENTS

| | | | |
|---|---|---|---|
| 9,490,850 | B1 | 11/2016 | Paniconi et al. |
| 9,681,155 | B2 | 6/2017 | Van Der Laan |
| 10,655,975 | B2 | 5/2020 | Zhang et al. |

OTHER PUBLICATIONS

Zeng, Dongdong et al., "Background Subtraction with Real-time Semantic Segmentation", Computer Vision and Pattern Recognition, Date: Dec. 2018, Publisher: Arxiv, https://arxiv.org/pdf/1811.10020.pdf.

*Primary Examiner* — Y Lee
(74) *Attorney, Agent, or Firm* — FINNEGAN, HENDERSON, FARABOW, GARRETT & DUNNER LLP

(57) ABSTRACT

This disclosure relates generally to method and system for live video streaming with integrated encoding and transmission semantics. The system receives a set of frames associated with a live video stream encoded to generate a set of data fragments using a reference encoder and a delta encoder. Transmitter unit of the live video streaming protocol transmits each packet of the set of full frames and the set of delta frames in sequence with a payload specific header based on a packet mode. Further, the receiver unit receives each packet of the full frames and each packet of the delta frames based on the packet mode to reconstruct an original sequence from the foreground pixels by estimating a total number of packets expected at each frame interval and loss incurred in each packet of the set of full frames and the set of delta frames.

20 Claims, 23 Drawing Sheets

(51) Int. Cl.
*H04N 19/169* (2014.01)
*H04N 19/189* (2014.01)

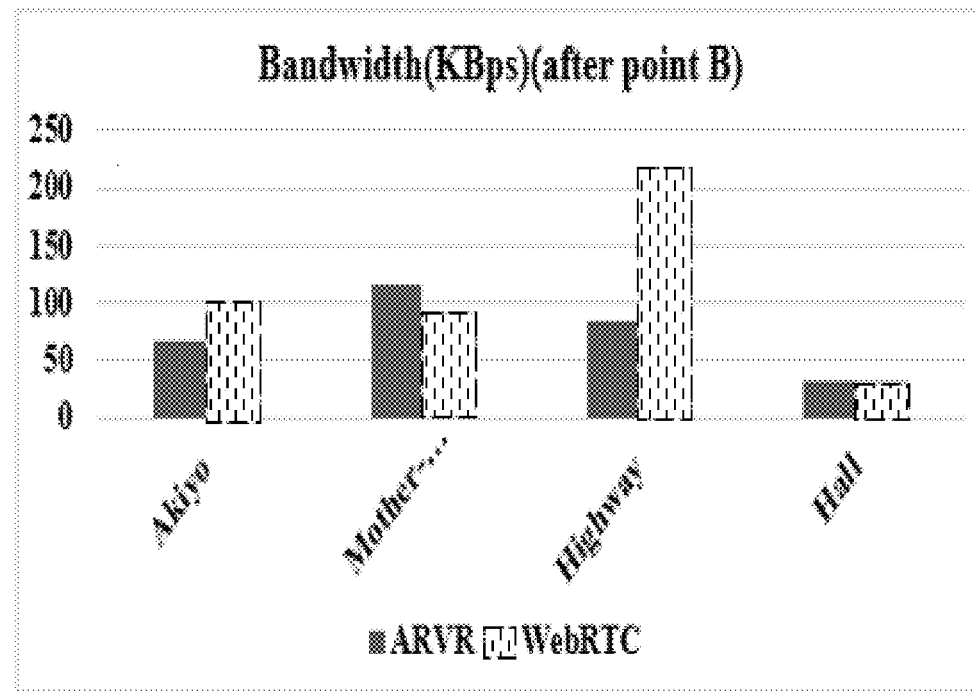
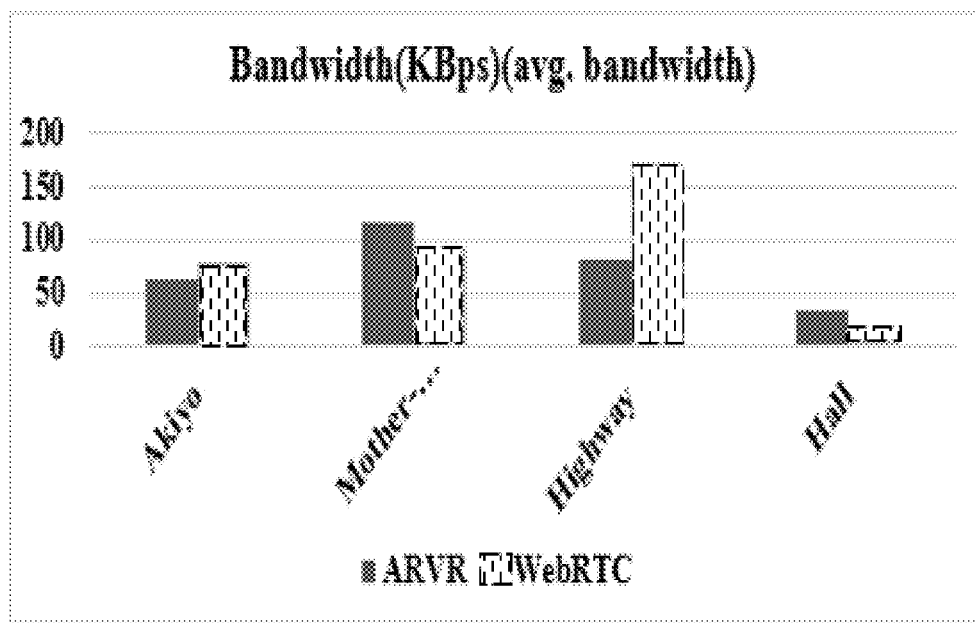
FIG.14B

METHOD AND SYSTEM FOR LIVE VIDEO STREAMING WITH INTEGRATED ENCODING AND TRANSMISSION SEMANTICS

CROSS-REFERENCE TO RELATED APPLICATIONS AND PRIORITY

This U.S. patent application claims priority under 35 U.S.C § 119 to: Indian patent Application no. 202221001608, filed on Jan. 11, 2022. The entire contents of the aforementioned application are incorporated herein by reference.

TECHNICAL FIELD

The disclosure herein generally relates to video streaming, and, more particularly, to method and system for live video streaming with integrated encoding and transmission semantics.

BACKGROUND

Rapidly growing use of mobile devices such as laptops, tablets and cellphones has greatly diversified available modes of media consumption. In other context, a wide variety of different media streaming techniques are known, including techniques for streaming of media over the Internet using hypertext transfer protocol (HTTP). Live video transmission over the Internet involves transmission of a sequence of images or frames from a source computer to one or more destination computers. The sequence of frames is often generated by an encoder according to one of any number of video compression and encoding standards. Each frame is divided into packets and these packets are transmitted or "streamed" by the source computer to the destination computers over an enterprise-wide IP network or the Internet. Traditional live video streaming over the Internet suffers from conflicting trade-off between reliability and real-time delivery. Due to the nature of IP network communication, it is possible that one or more packets in the video stream may be lost during transmission or may arrive at the destination computer corrupted. As a result, user experience suffers.

Existing techniques use hypertext transfer protocol (HTTP) on transport control protocol (TCP) as a reliable transport and use backward error correction mechanism of TCP to recover lost segments to regain the peak signal to noise ratio (PSNR) with real-time penalty. But, under lossy conditions, such techniques suffer from poor real-time performance and degraded user experience. Due to delay in recovery owing to block-wise structure of error-correcting codes and slow reaction to changing channel condition. End user experience depends on combined performance of application layer encoding/decoding and corresponding underlying transport mechanism. Further, the application layer listens to the channel through transport and reacts to maintain the Quality of Service (QoS) as well as user experience. But traditional group of pictures (GOP) based encoding inherently is slow reactive. Failure to recover partially or fully lost I-frame causes loss of synchronization and latency due to large recovery time as consecutive GOP is in wait state. While most of the existing approaches evolved to satisfy applications such as video on demand, fails to satisfy requirements for strictly real-time interactive applications.

SUMMARY

Embodiments of the present disclosure present technological improvements as solutions to one or more of the above-mentioned technical problems recognized by the inventors in conventional systems. For example, in one embodiment, a method and system for live video streaming with integrated encoding and transmission semantics is provided. The system includes encoding a set of frames associated with a live video stream of a live video streaming protocol to generate a set of data fragments by using a reference encoder and a delta encoder. The reference encoder generates a set of full frames comprising of encoded MCU (Minimum Coded Unit) blocks corresponding to a complete jpeg frame of the live video stream. The delta encoder generates a set of delta frames which consist of encoded MCU blocks corresponding to foreground pixels of a current frame obtained from a background subtraction module. Further, by using a transmitter unit of the live video streaming protocol periodically transmits (i) each packet from the set of full frames and each packet from the set of delta frames are transmitted in sequence with a payload specific header based on a packet mode, and (ii) providing a region of interest (ROI) information to the transmitter unit as pixel boundaries for each packet by computing a scaling factor. Here, each packet of the payload specific header is categorically inferred as at least one of a critical with confirmable communication semantics, and a non-critical with non-confirmable communication semantics. Further, by using a receiver unit of the live video streaming protocol receive each packet of the full frames and each packet of the delta frames based on the packet mode to reconstruct an original sequence of the live video stream from the foreground pixels. Further, each packet comprising the set of delta frames are decoded using a delta decoder and each packet comprising the set of full frames are decoded using a reference decoder by estimating, (i) a total number of packets expected at each frame interval from the payload specific header, and (ii) a loss incurred in each packet from the set of full frames and the set of delta frames.

In another aspect, a method for live video streaming with integrated encoding and transmission semantics is provided. The method includes encoding a set of frames associated with a live video stream of a live video streaming protocol to generate a set of data fragments by using a reference encoder and a delta encoder. The reference encoder generates a set of full frames comprising of encoded MCU (Minimum Coded Unit) blocks corresponding to a complete jpeg frame of the live video stream. The delta encoder generates a set of delta frames which consist of encoded MCU blocks corresponding to foreground pixels of a current frame obtained from a background subtraction module. Further, by using a transmitter unit of the live video streaming protocol periodically transmits (i) each packet from the set of full frames and each packet from the set of delta frames are transmitted in sequence with a payload specific header based on a packet mode, and (ii) providing a region of interest (ROI) information to the transmitter unit as pixel boundaries for each packet by computing a scaling factor. Here, each packet is categorically inferred as at least one of a critical with confirmable communication semantics, and a non-critical with non-confirmable communication semantics. Further, by using a receiver unit of the live video streaming protocol receive each packet of the full frames and each packet of the delta frames based on the packet mode to reconstruct an original sequence of the live video stream from the foreground pixels. Further, each packet comprising the set of delta frames are decoded using a delta decoder and each packet comprising the set of full frames are decoded using a reference decoder by estimating, (i) a total number of packets expected at each frame interval from the payload specific header, and (ii) a loss incurred in each packet from the set of full frames and the set of delta frames.

In yet another aspect, a non-transitory computer readable medium provides one or more non-transitory machine-readable information storage mediums comprising one or more instructions, which when executed by one or more hardware processors perform actions includes an I/O interface and a memory coupled to the processor is capable of executing programmed instructions stored in the processor in the memory to encode a set of frames associated with a live video stream of a live video streaming protocol to generate a set of data fragments by using a reference encoder and a delta encoder. The reference encoder generates a set of full frames comprising of encoded MCU (Minimum Coded Unit) blocks corresponding to a complete jpeg frame of the live video stream. The delta encoder generates a set of delta frames which consist of encoded MCU blocks corresponding to foreground pixels of a current frame obtained from a background subtraction module. Further, by using a transmitter unit of the live video streaming protocol periodically transmits (i) each packet from the set of full frames and each packet from the set of delta frames are transmitted in sequence with a payload specific header based on a packet mode, and (ii) providing a region of interest (ROI) information to the transmitter unit as pixel boundaries for each packet by computing a scaling factor. Here, each packet of the payload specific header is categorically inferred as at least one of a critical with confirmable communication semantics, and a non-critical with non-confirmable communication semantics. Further, by using a receiver unit of the live video streaming protocol receive each packet of the full frames and each packet of the delta frames based on the packet mode to reconstruct an original sequence of the live video stream from the foreground pixels. Further, each packet comprising the set of delta frames are decoded using a delta decoder and each packet comprising the set of full frames are decoded using a reference decoder by estimating, (i) a total number of packets expected at each frame interval from the payload specific header, and (ii) a loss incurred in each packet from the set of full frames and the set of delta frames.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 14A and FIG. 14B illustrates an example graphical comparison of bandwidth consumption of streamed video between ARV with ROI and WebRTC using the system of FIG. 1, in accordance with some embodiments of the present disclosure.

FIG. 15A and FIG. 15B illustrate an exemplary comparison of full referential visual quality metrics between ARV with ROI and WebRTC using the system of FIG. 1, in accordance with some embodiments of the present disclosure.

DETAILED DESCRIPTION OF EMBODIMENTS

Figure 1:
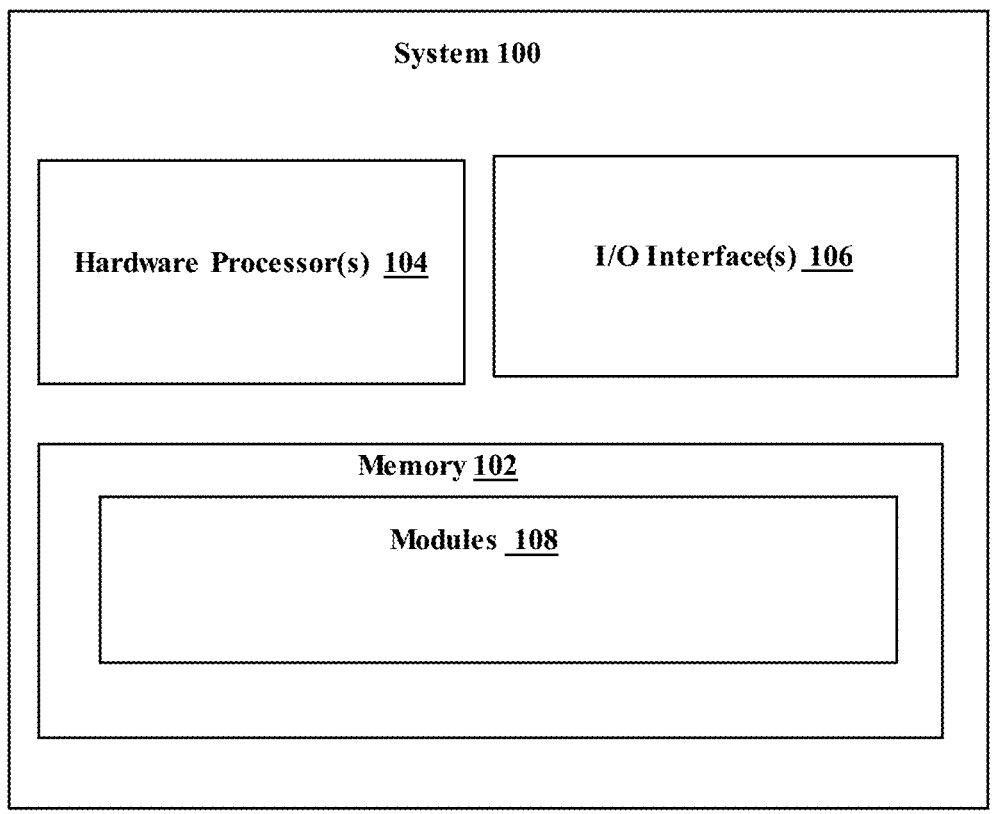
FIG. 1 illustrates an exemplary system 100 (alternatively referred as live video streaming protocol) with integrated encoding and transmission protocol, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments herein provide a method and system for live video streaming with integrated encoding and transmission semantics. The system herein may be alternatively referred as live video streaming protocol 100. An adaptive real time streaming for things with improved quality visual background extractor (ViBe) herein may be alternatively referred as ARV or A-REaLiSTIQ-ViBe. Further, an ARV with region of interest (ROI) may be alternatively referred as ARV with ROI. Streaming video content over the Internet is quickly gaining popularity as a way to view video content. The method enables providing a resource efficient transmission semantics protocol tightly coupled with frame-by-frame temporal delta encoder. Here, the delta encoder is performed using a background extraction method known as visual background extractor (ViBe) and such frame-by-frame approach ensures quick response of original image recovery from impairment, and robust transport semantics ensures resilience. Also, the method is adaptive while switching between a full frame and a delta frame from the received original video stream. Each encoded frame comprises of a payload packet structure which is adaptive and reliable based on criticality of packets being transmitted. Encoded delta frames can be protected over the air and its loss can be concealed to user satisfaction without any significant control overhead there by maintaining real time performance. Additionally, region of interest (ROI) information in encoding mechanism improves bitrate efficiency without undermining user experience and reduced network cost. The efficacy of the method is proven through experiments under both emulated channel impairments and real-life last mile channel degradation typically in mobile environments. The performance of ARV or ARVR is benchmarked against standard web real time communication (WebRTC) implementation in same network settings with a full referential visual metrics, a subjective Mean Opinion Score (MOS) from users, and a bandwidth efficiency. The system 100 is further explained with the method as described in conjunction with FIG. 1 to FIG. 16D below.

Glossary

A-REaLiST—Adaptive real time streaming for things
A-REaLiSTIQ—Adaptive real time streaming for things with improved quality
ViBe—Visual background extractor
A-REaLiSTIQ-ViBe or ARV—An adaptive real time streaming for things with improved quality visual background extractor
WebRTC—web real time communication Referring now to the drawings, and more particularly to FIG. 1 through FIG. 16D, where similar reference characters denote corresponding features consistently throughout the figures, there are shown preferred embodiments and these embodiments are described in the context of the following exemplary system and/or method.

FIG. 1 illustrates an exemplary system 100 (alternatively referred as live video streaming protocol) with integrated encoding and transmission protocol, in accordance with some embodiments of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
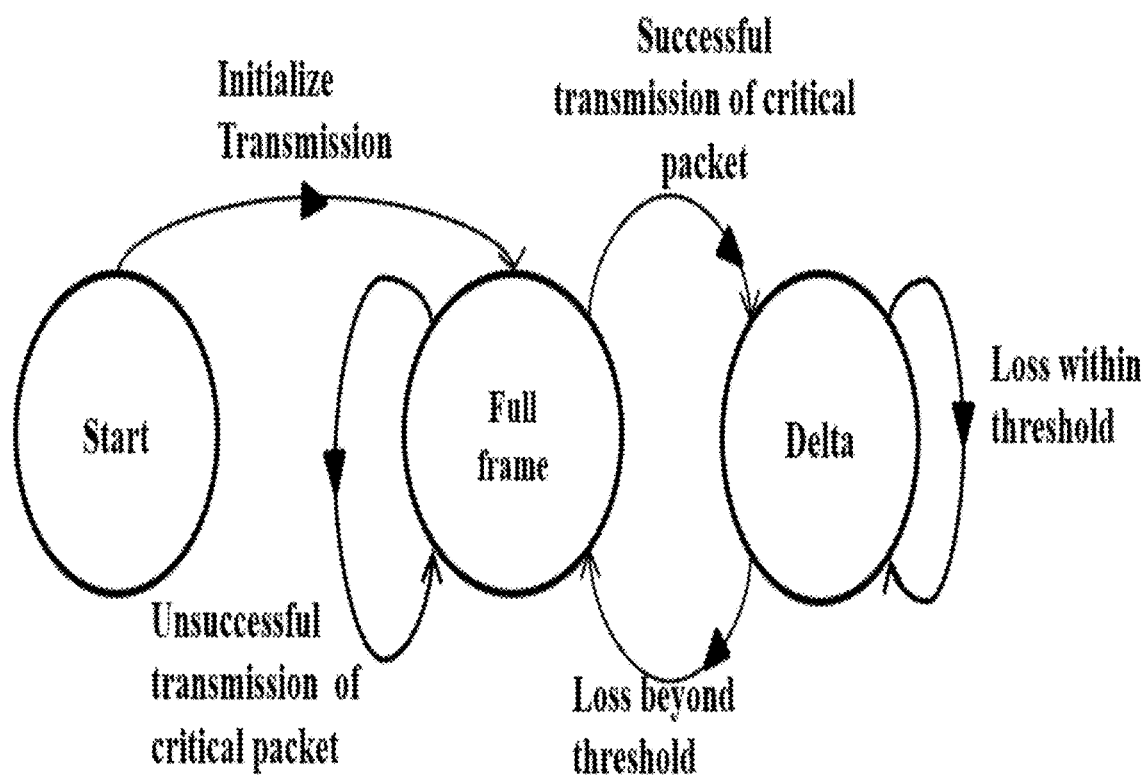
FIG. 2 illustrates a state transition diagram of an adaptive real time streaming for things with improved quality visual background extractor (alternatively referred as ARV or A-REaLiSTIQ-ViBe) between a full frame mode and a delta mode using the system 100 of FIG. 1, in accordance with some embodiments of the present disclosure.

FIG. 2 illustrates a state transition diagram of an adaptive real time streaming for things with improved quality visual background extractor (alternatively referred as ARV or A-REaLiSTIQ-ViBe) between a full frame mode and a delta mode using the system 100 of FIG. 1, in accordance with some embodiments of the present disclosure. User transmitted live video stream is an input to the system 100 which switches between states to reach receiver end. State transition includes a start state, a full frame state, and a delta state. The system 100 switches adaptively between the full frame state to process a set of full frames using a reference encoder and a delta state to process a set of delta frames using a delta encoder. The reference encoder generates a set of full frames comprising of encoded MCU (Minimum Coded Unit) blocks corresponding to a complete jpeg frame of the live video stream. The set of delta frames are encoded MCU blocks corresponding to foreground pixels of each current frame when derived from the background subtraction mechanism of ViBe. The system 100 will be in delta state while transferring the set of delta frames and in full frame state while transferring the set of full frames. Each full frame is reported to undergo a loss when the system 100 remains in the full frame state. Since, the set of full frames are proper JPEG, and the same packetization scheme of A-REaLiSTIQ is used. The set of delta frames are simply a bunch of encoded MCU blocks without a proper JPEG frame structure.

Figure 3:
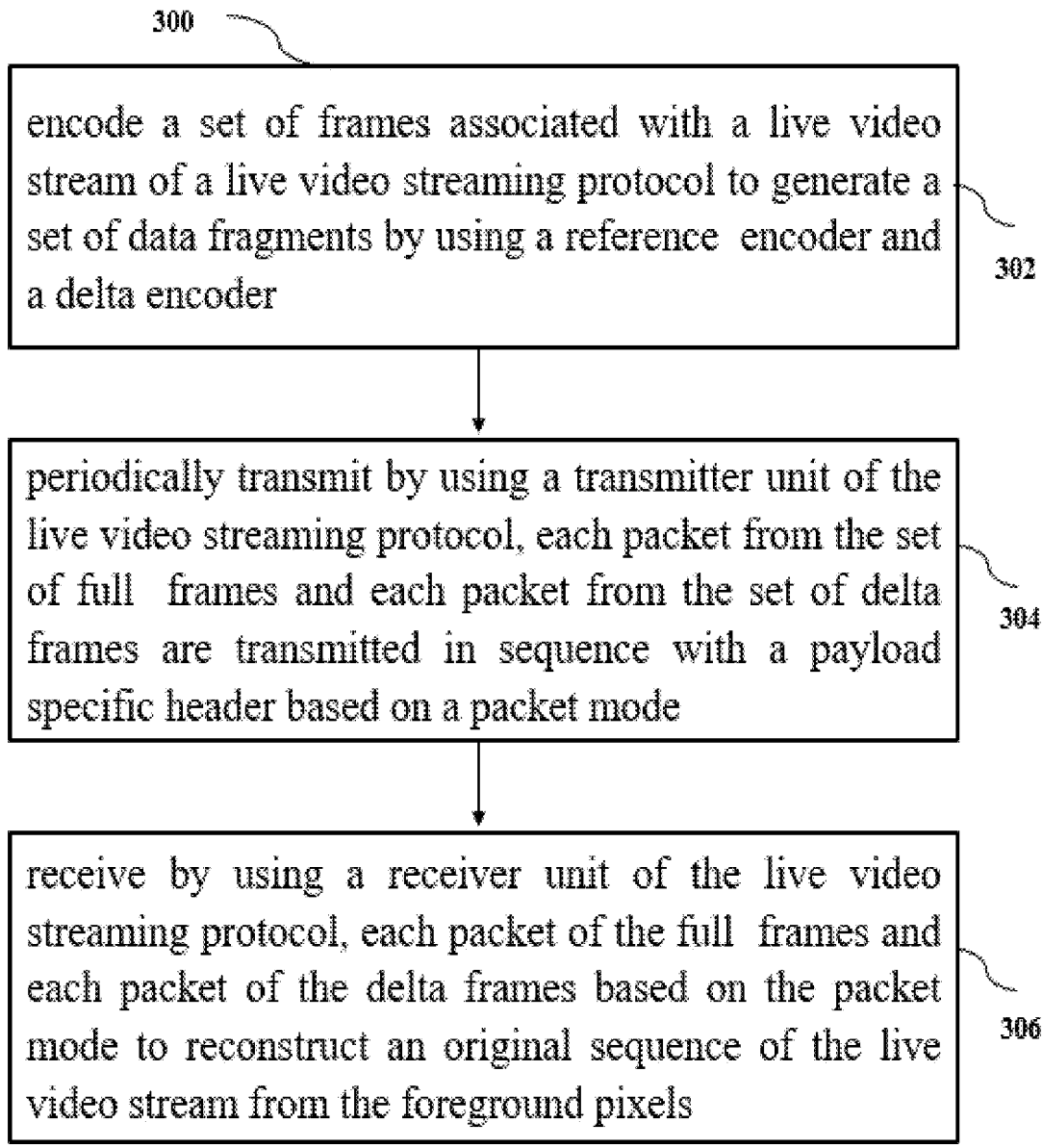
FIG. 3 illustrates an exemplary flow diagram illustrating a method to reconstruct an original sequence of the live video stream from the foreground pixels using the system of FIG. 1, in accordance with some embodiments of the present disclosure.

FIG. 3 illustrates an exemplary flow diagram illustrating a method to reconstruct an original sequence of the live video stream from the foreground pixels using the system of FIG. 1, in accordance with some embodiments of the present disclosure. In an embodiment, the live video streaming system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the live video streaming system 100 as depicted in FIG. 2 through FIG. 16D. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method 300 the one or more hardware processors 104 encode, a set of frames associated with a live video stream of a live video streaming protocol to generate a set of data fragments by using, (i) a reference encoder, a set of full frames comprising of encoded MCU (Minimum Coded Unit) blocks corresponding to a complete jpeg frame of the live video stream, and (ii) a delta encoder, a set of delta frames which consist of encoded MCU blocks corresponding to foreground pixels of a current frame obtained from a background subtraction module. Considering a scenario, where users may stream media content from at least one electronic devices (e.g., mobile devices, computer, tablets) which includes media content captured locally on a mobile device for instance, the streaming of live audio and video during a video call. It may also include media content stored on the mobile device, such as a video stored locally. For example, the transmitter unit encodes the live video stream and generates the set of fragmented data using the reference encoder and the delta encoder. Here, the set of full frames is a complete jpeg frame of the live video stream. The reference encoder generates the set of full frames comprising of encoded MCU (Minimum Coded Unit) blocks corresponding to a complete jpeg frame of the live video stream. The delta encoder generates the set of delta frames comprising of encoded MCU blocks corresponding to foreground pixels of a current frame obtained from a background subtraction module. Here, the system 100 may include one or more streaming servers configured to encode and stream media content over a network, such as Internet.

An important metric for streaming video content over the Internet is a quality level which indicates the quality of the streamed video being received at the receiver unit. The quality level is indicated by a selected bitrate for transmitting video content over the Internet. The switch between each state depends on the periodic feedback from the receiver unit with the loss indicator.

At step 304 of the method 300 the one or more hardware processors 104 periodically transmit by using a transmitter unit of the live video streaming protocol, (i) each packet from the set of full frames and each packet from the set of delta frames are transmitted in sequence with a payload specific header based on a packet mode, and provide a region of interest (ROI) information to the transmitter unit as pixel boundaries for each packet by computing a scaling factor, wherein each packet of the payload specific header is categorically inferred as at least one of a critical with confirmable communication semantics, and a non-critical with non-confirmable communication semantics. ARV follows the principles of A-REaLiST for payload specific adaptive reliability based on criticality of packets. The packet mode includes a full frame mode and a delta mode payload specific header (FIG. 7) meta-data in each frame inferred as critical and are transmitted using the confirmable (CON) communication semantics of CoAP. The non-critical packets are transferred by combining the non-confirmable (NON) communication semantics with no response option to create an open-loop RESTful transmission. ARV follows packetization scheme of A-REaLiSTIQ for each JPEG frame limiting the effect of loss of non-critical packets in each frame, but ARV needs to protect the set of delta encoded frames.

Each packet of delta frame is constructed by obtaining a segmentation map and the current delta frame. Further, a packet buffer and a current packet size of delta frame are initialized with zeros. Then, the header meta data information is inserted in the current delta frame and the foreground MCU blocks. Further, each packet of delta frame having only foreground MCU blocks is transmitted based on a maximum transmission unit (MTU) size based on a set of criterions listed below, Criterion 1—if the sum of current packet size and a total size of the MCU block is greater than MTU size then bits are padded in the current packet and reset the current packet size with zeros, and Criterion 2—if the sum of current packet size and the total size of the MCU block is equal to the MTU size then reset the current packet size with zeros.

In one embodiment, region of interest (ROI) information is provided to the delta encoder as a pixel boundary. Scaling factor (S) indicates the ratio of quality between the region within ROI and beyond ROI.

Let, M=encoded MCU matrix before quantization and Q=quantization matrix for each frame.

Therefore, for each MCU blocks in the non-ROI region ($M_{NR}$), indices of the quantized MCU matrix ($M_{QNR}$) are computed as given below in Equation 1, $$M_{QNR} = \text{ROUND}(M_{NR}/(Q^{\overline{l_2}} S))^{\overline{l_2}} S \quad \text{Equation 1}$$

Equation 1 effectively decreases the number of non-zero values in the matrix when dominant values are reverted to the original form. Hence, significant saving in bandwidth is achieved while the receiver unit decodes with the original Q in usual manner without really considering additional ROI information. The MCU block values in the non-ROI region are scaled down and rounded off with the scaling factor to reduce non-zero MCU blocks being transmitted without affecting the receiver operation and without informing the receiver unit about the scaling factor.

The following example describes the concept with typical MCU matrices.

Let, M_Y, M_Cb, M_Cr are the encoded MCU matrices for Y, Cb and Cr components respectively. In a typical case, $$M\_Y = \begin{bmatrix} 734.29 & 17.43 & -114.97 & 19.001 & -13.93 & 1.32 & -5.67 & 2.20 \\ -4.01 & -6.98 & -3.125 & 4.59 & -2.56 & 4.91 & -5.125 & -1.68 \\ 0.736 & -0.88 & -1.477 & 1.128 & 0.62 & 0.38 & 1.102 & -4.39 \\ 0.69 & -0.58 & 2.10 & -0.95 & 1.68 & 1.05 & -0.004 & -0.04 \\ -0.22 & -1.659 & 2.16 & -3.71 & -0.26 & -0.459 & 1.25 & -1.375 \\ 3.7 & -3.95 & -1.30 & 2.64 & -1.01 & -1.36 & 2.33 & 1.65 \\ -0.90 & 1.15 & -0.433 & -0.29 & -0.48 & -1.376 & 0.99 & 3.13 \\ 2.88 & -1.09 & -1.69 & -1.68 & 1.46 & 0.32 & 0.25 & -0.23 \end{bmatrix}$$

$$M\_Cb = \begin{bmatrix} 0.7531 & 0.7717 & 12.606 & 9.88 & 8.10 & 1.45 & -0.0432 & -0.524 \\ -8.644 & -0.90 & 0.00 & -3.06 & -4.33 & 0.86 & 0.00 & 0.028 \\ 0.00 & -1.75 & -3.90 & 0.00 & 0.60 & -4.09 & 2.04 & 0.00 \\ -1.23 & 0.00 & -0.57 & -0.60 & -0.15 & 0.217 & 1.17 & 0.00 \\ 0.00 & 2.607 & 3.580 & -2.507 & -1.61 & 1.79 & 0.82 & 0.00 \\ 0.82 & 1.79 & -1.61 & 1.719 & 1.61 & 0.00 & 0.00 & 0.72 \\ 0.104 & -0.17 & 0.00 & -0.55 & 0.00 & 0.609 & 0.00 & -1.08 \\ -0.48 & 0.00 & 0.114 & -0.743 & -0.407 & -0.712 & -0.04 & 0.32 \end{bmatrix}$$

$$M\_Cr = \begin{bmatrix} -0.83 & 0.25 & -10.31 & 8.21 & 6.20 & 2.16 & -0.76 & 1.38 \\ 6.69 & 3.26 & 0.00 & -1.80 & -0.30 & 0.25 & 0.00 & 0.50 \\ 0.00 & 0.196 & -0.019 & 0.00 & -2.17 & -3.40 & 1.20 & 0.00 \\ -0.63 & 0.00 & -0.17 & -0.89 & -0.04 & -0.57 & -0.13 & 0.00 \\ 0.00 & 0.012 & -2.77 & 2.05 & -1.23 & 0.125 & 0.42 & 0.00 \\ 0.42 & 0.125 & -1.23 & -1.33 & 0.007 & 0.00 & 0.00 & -0.08 \\ -0.27 & -0.05 & 0.00 & -0.28 & 0.00 & 0.35 & 0.00 & -0.005 \\ 0.054 & 0.00 & 0.033 & -0.05 & -0.23 & 0.55 & 0.11 & 0.245 \end{bmatrix}$$

Let, Q is the quantization matrix. A typical value of Q is:

$$\begin{bmatrix} 13 & 27 & 27 & 40 & 35 & 40 & 78 & 43 \\ 43 & 78 & 165 & 110 & 93 & 110 & 165 & 165 \\ 165 & 165 & 165 & 165 & 165 & 165 & 165 & 165 \\ 165 & 165 & 165 & 165 & 165 & 165 & 165 & 165 \\ 165 & 165 & 165 & 165 & 165 & 165 & 165 & 165 \\ 165 & 165 & 165 & 165 & 165 & 165 & 165 & 165 \\ 165 & 165 & 165 & 165 & 165 & 165 & 165 & 165 \\ 165 & 165 & 165 & 165 & 165 & 165 & 165 & 165 \end{bmatrix}$$

Let, the scaling factor $S = 5$.

Let, Q_M_Y_R, Q_M_Cb_R, Q_M_Cr_R are the quantized MCUs for the ROI region. The values are derived from Eqn. 1 without the Scaling factor. The derived values are:

$$Q\_M\_Y\_R = \begin{bmatrix} 61 & 1 & -6 & 1 & -1 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

$$Q\_M\_Cb\_R = \begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

$$Q\_M\_Cr\_R = \begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

Considering the non-zero components, the resultant size of the quantized MCU for ROI is: 30 bytes.

Let, Q_M_Y_NR, Q_M_Cb_NR, Q_M_Cr_NR are the quantized MCUs for the Non-ROI region. The values are derived from Eqn. 1 considering the scaling factor. The derived values are:

$$Q\_M\_Y\_NR = \begin{bmatrix} 12 & 0 & -1 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

$$Q\_M\_Cb\_NR == \begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

$$Q\_M\_Cr\_NR == \begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

Thus, despite scaling, the dominant quantized components are retrieved before transmission which allows the receiver unit to decode without having knowledge of the scaling factor, while the size has been reduced to 20 bytes with 33% saving in bandwidth.

Figure 4:
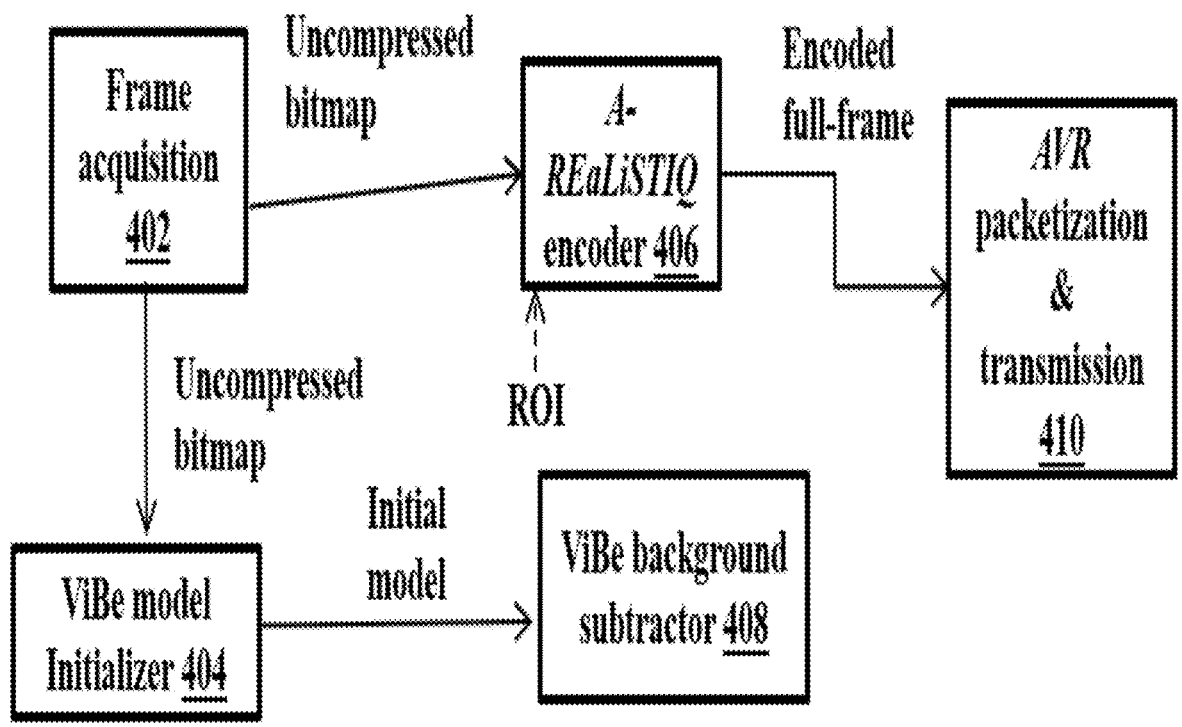
FIG. 4 illustrates logical block diagram of a transmitter unit of first frame when background model is initialized using the system of FIG. 1, in accordance with some embodiments of the present disclosure.

In one embodiment, referring now to FIG. 4 illustrates logical block diagram of the transmitter unit of first frame when background model is initialized using the system of FIG. 1, in accordance with some embodiments of the present disclosure. The transmitter unit comprises of a frame acquisition 402, a ViBe model initializer 404, a A-REaLiSTIQ encoder 406, a ViBe background subtractor 408 and a AVR packetization transmission 410. Referring now to the above example, the received live video stream is transmitted to the receiver unit, where frames of the video stream are encoded to generate a set of data fragments. Each data fragment consists of encoded pixels of entire frame or encoded pixels of the foreground elements of the frame. Further, based on the transmission protocol, the transmitter unit transmits the full frame or the delta frame and then packets are created comprising of MCU blocks of encoded pixels and the payload specific header when the transmitter unit of first frame when background model is initialized to corresponding its state.

Figure 5:
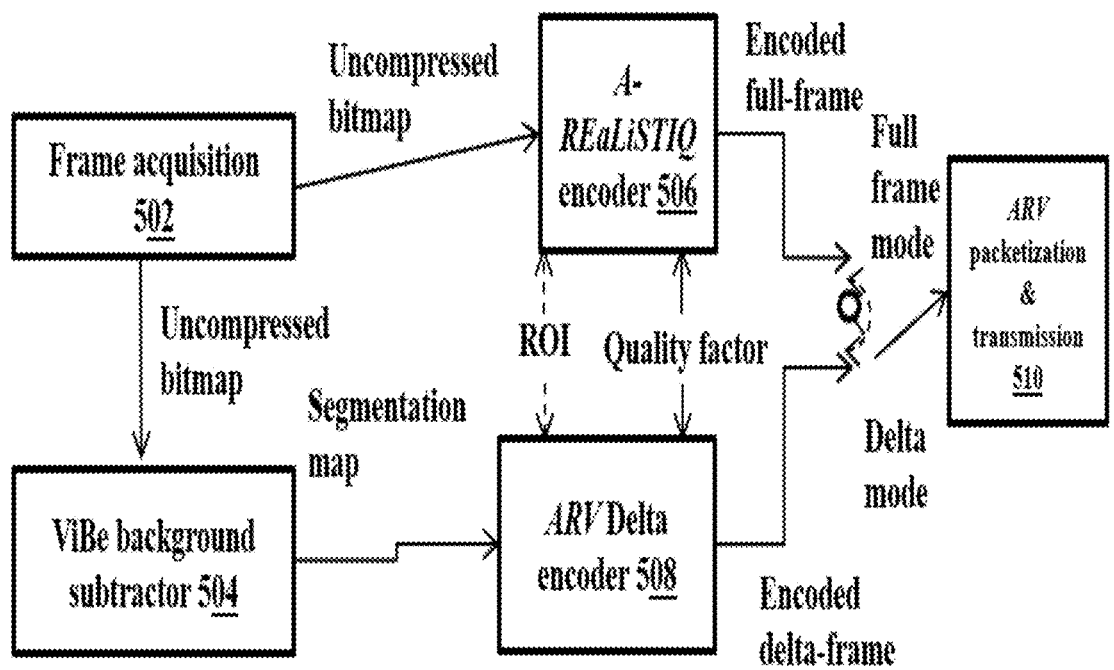
FIG. 5 illustrates logical block diagram of a transmitter unit of the live video streaming protocol with optional ROI feature using the system of FIG. 1, in accordance with some embodiments of the present disclosure.

Referring now to FIG. 5 illustrates logical block diagram of a transmitter unit of the live video streaming protocol with optional ROI feature using the system of FIG. 1, in accordance with some embodiments of the present disclosure. The transmitter unit comprises of a frame acquisition 502, a ViBe background subtractor 504, a A-REaLiSTIQ encoder 506, a AVR delta encoder 508, and a AVR packetization transmission 510. Referring now to the above example, for each frame acquisition 502, the transmitter unit maintains both full frame and the delta frame thereby selecting current frame depending on the current state of the mode type such as a full frame mode, or a delta mode. The transmitter unit chooses the current frame depending on the present state based on at least one of the full frame modes and the delta mode. Usually, the set of delta frames are of much smaller size and can be transmitted at much higher rate. As the system 100 switches between the modes such as he full frame mode and the delta mode, effective frame rate is automatically adapted corresponding to the mode and the transmitter unit maintains a periodic timer. Each time the timer expires, the first packet of current frame is transmitted in CON mode. The receiver unit responds with cumulative packet loss rate ($C_{mk}$) piggybacked with the ACK. Depending on the value of ($C_{mk}$), the transmitter unit decides to send next frame as full frame if $C_{mk}$ crosses certain predefined threshold. Therefore, each full frame brings down the frame rate while re-establishing the quality as the loss in delta encoded frame prevents to propagate. Subsequently, the transmitter unit responds to channel variations per frame basis and adapts the bitrate while maintaining the visual quality. The delta encoder takes segmentation map as an input from ViBe and puts zero for the background pixels. Only the foreground pixels are JPEG encoded into the MCU blocks. The A-REaLiSTIQ and AVR delta encoder block follows the principles of JPEG encoder while considering packetization. Further, the segmentation map is generated for the set of full frames and the set of delta frames.

At step 306 of the method 300 the one or more hardware processors 104 receive by using a receiver unit of the live video streaming protocol, each packet of the full frames and each packet of the delta frames based on the packet mode to reconstruct an original sequence of the live video stream from the foreground pixels, wherein each packet comprising the set of delta frames are decoded using a delta decoder and each packet comprising the set of full frames are decoded using a reference decoder by estimating, (i) a total number of packets expected at each frame interval from the payload specific header, and (ii) a loss incurred in each packet from the set of full frames and the set of delta frames. The payload specific header (FIG. 7) comprises of a status flag, a start MCU index, an end MCU index, one or more padding bits, and a delta DC value of last MCU of a previous packet. For each frame, the receiver unit (FIG. 5) parses each packet to check whether it belongs to the full frame or the delta frame. The offset field of first packet comprises of a position indicator of last possible packet in each frame. This estimates the total number of packets expected for each frame. At each playout interval t, the receiver unit computes an instantaneous cumulative error rate at time t, $C_{mk}^t$ as given below in Equation 2 and reports it back to the transmitter unit on expiry of periodic timer by sponging with ACK of corresponding CON packet and a new reporting interval starts. The instantaneous cumulative error rate $C_{mk}^t$ is computed at the beginning of each payload specific header interval based on a total number of packet loss, a total number of expected packets and a transmitted payload specific header. Thus, $C_{mk}^0=0$ (for first frame or at the beginning of each reporting interval) and, $$C_{mk}^t = N_{lost}/N_{total} * 100 + C_{mk}^{t-1}$$  Equation 2 where,
$N_{lost}$=Total number of packets lost,
$N_{total}$=Total number of expected packets.

Figure 6:
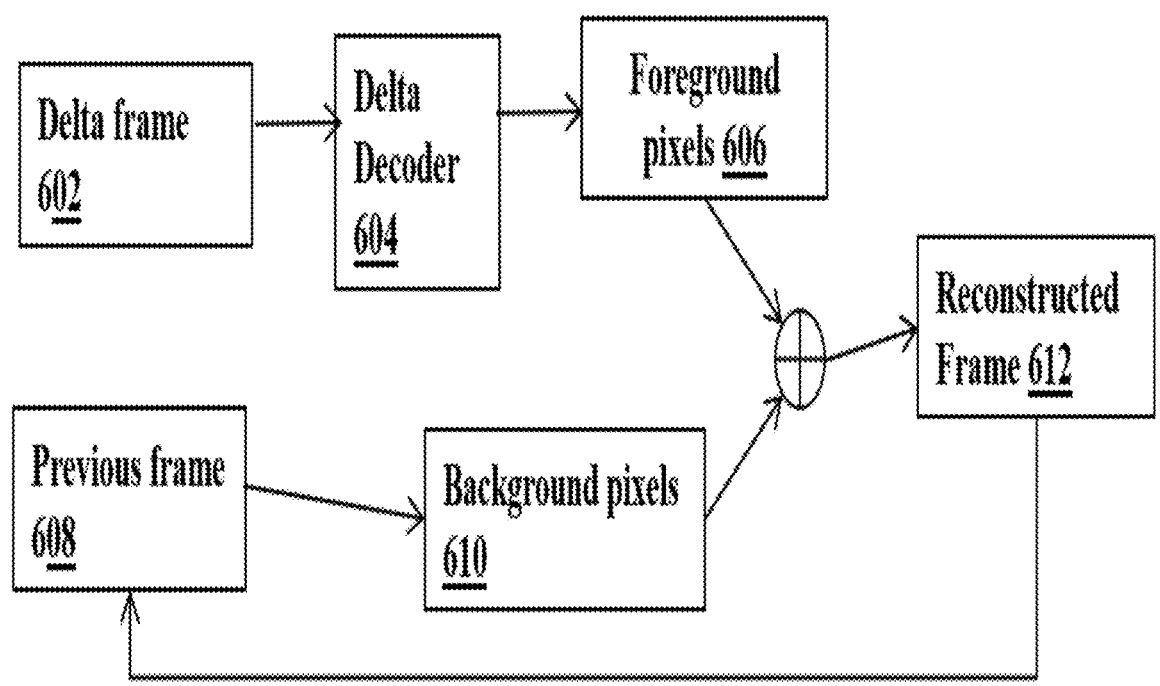
FIG. 6 illustrates logical block diagram of a receiver unit for full frame reconstruction from the received delta frames using the system of FIG. 1, in accordance with some embodiments of the present disclosure.

FIG. 6 illustrates logical block diagram of a receiver unit for full frame reconstruction from the received delta frames using the system of FIG. 1, in accordance with some embodiments of the present disclosure. The receiver unit comprises of a delta frame 602, a delta decoder 604, a foreground pixels 606, a previous frame 608, a background pixels 610, a switch mode having a full frame mode and a delta mode and a reconstructed frame 612. The receiver unit obtains each packet of delta frame which is further decoded using the delta decoder to obtain the foreground pixels. From each previous full frame background pixels are obtained which are then parsed to check whether it belongs to the delta frame or the full frame to reconstruct the original signal being transmitted.

Figure 7:
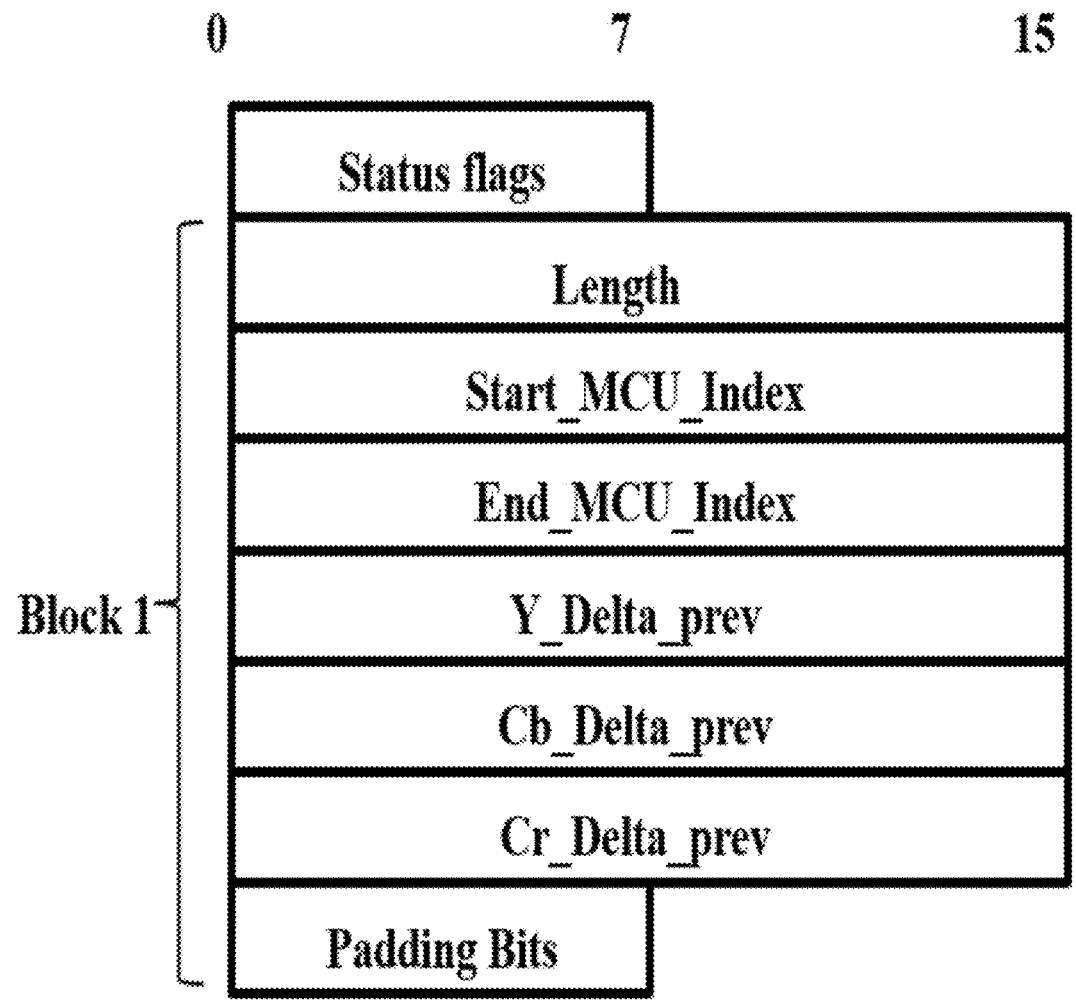
FIG. 7 illustrates packet structure of payload specific header using the system of FIG. 1, in accordance with some embodiments of the present disclosure.

FIG. 7 illustrates packet structure of payload specific header using the system of FIG. 1, in accordance with some embodiments of the present disclosure. The packet structure of payload header with contiguous foreground MCU blocks are packed in integer number of continuous packets with necessary bit stuffing to ensure byte-alignment of the encoded MCU blocks.

TABLE 1

MCU payload specific header

| Name | Description |
|---|---|
| Status flags | It consists of least signification 2 bits of the first byte of first packet of a frame. Bits 2-7 are reversed. Bit 0 indicates full frame if it is set else it indicates a delta frame. Bit 1 indicates periodic timer status. If set, it indicates expiry of the periodic timer within the current frame. This field is followed by variable length blocks. Each such block consists of contiguous foreground MCU blocks along their payload specific header. |
| Start MCU Index and End MCU Index | It is used to place the foreground MCU blocks correctly according to entire image at A-REaLiSTIQ based on the delta decoder |

TABLE 1-continued

MCU payload specific header

| Name | Description |
| --- | --- |
| Padding Bits | It helps byte align MCU blocks which are bit aligned as per entropy encoding mechanism of JPEG. Most significant bit of padding bits is the contiguous bit. It is used to indicate whether the chain of foreground MCU blocks is immediately successive to previous block of foreground MCU blocks.<br>Contigious bit = (Padding bits & 0xf0) >> 7 |
| Y_Delta_prev, Cb_Delta_prev, Cr_Delta_prev | Indicate the Y, Cb, Cr values of DC components of last MCU blocks in previous block of contiguous foreground MCU blocks. It is required for reconstructing missing foreground MCU blocks in case of channel loss. |
| Length | Indicates length of chain of encoded foreground MCU blocks in bytes |

In most cases those fit in a single MTU size. For each packet the MCU payload is preceded by a packet specific header as mentioned in Table 1.

Figure 8:
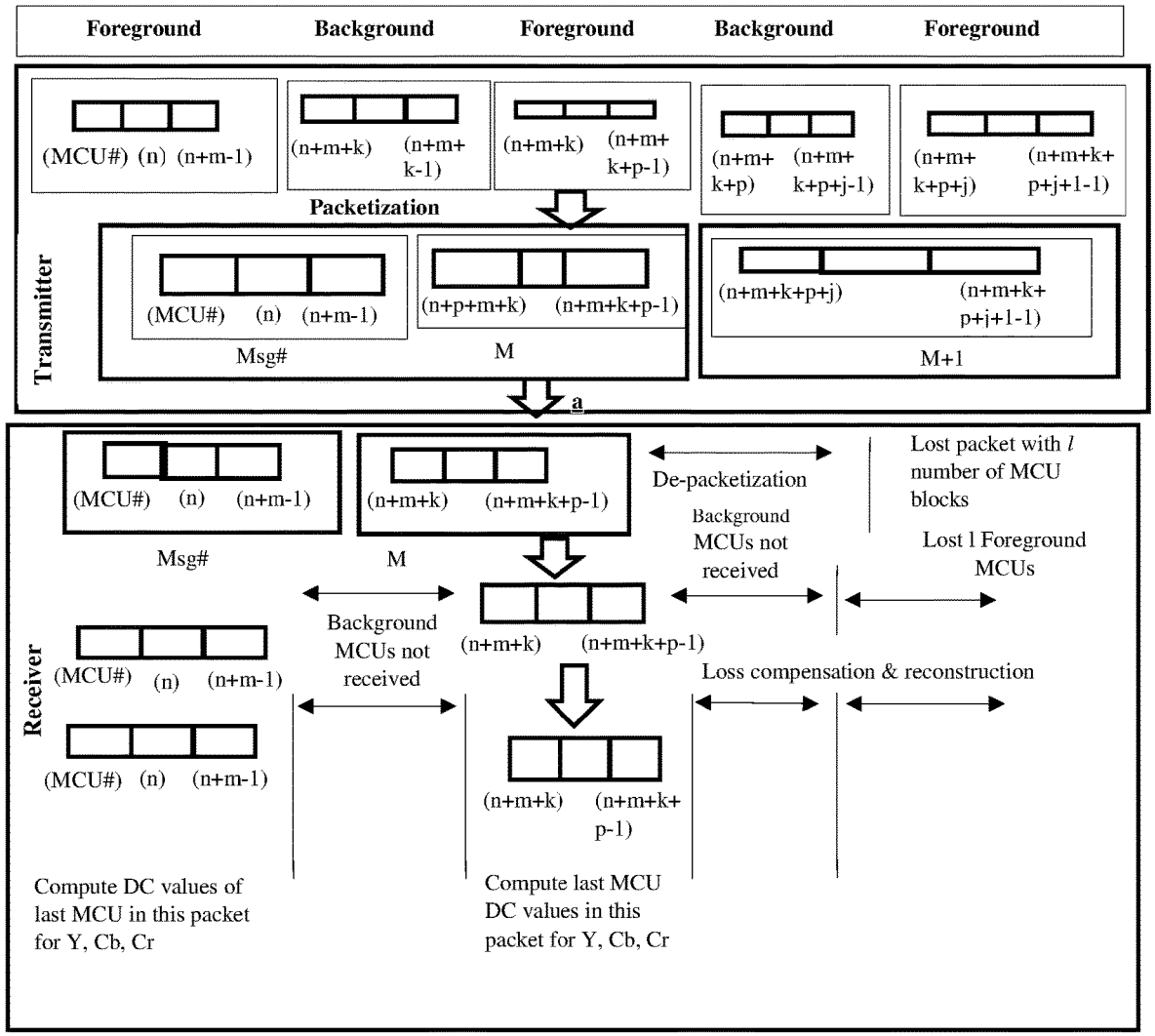
FIG. 8 illustrates frame reconstruction of delta encoded packets from original sequence under lossy and lossless transmission using the system of FIG. 1, in accordance with some embodiments of the present disclosure.

FIG. 8 illustrates frame reconstruction of delta encoded packets from original sequence under lossy and lossless transmission using the system of FIG. 1, in accordance with some embodiments of the present disclosure. Decoding mechanism for both lossless and lossy conditions are illustrated in FIG. 8. If the received frame is lossless, the foreground pixels are obtained by decoding the received encoded foreground MCU blocks. Background pixels are obtained from corresponding pixels of the last full frame and combined to render a full frame. If the received full frame is lossy, the method of the present disclosure minimizes effect and improves visual perception. However, for the set of delta frames receiver unit only gets encoded foreground MCU blocks based on luminous parameters such as a Y_Delta_prev, a Cb_Delta_prev and a Cr_Delta_prev fields and then calculates the Y, Cb, Cr values of DC components of the last MCU block with contiguous chain of foreground MCU blocks using a Huffman decoder. Using the DC values, the Huffman encoded values for the immediate next background MCU blocks are calculated in such a way that decoding the background MCU blocks would generate pixels with value zero without tampering the information contained in the foreground MCU blocks. The MCU blocks are JPEG decoded to generate pixels. If the received delta frame is lossless, the missing foreground MCU blocks are considered as background MCU blocks following similar reconstruction mechanism of lossless condition.

Figure 9A:
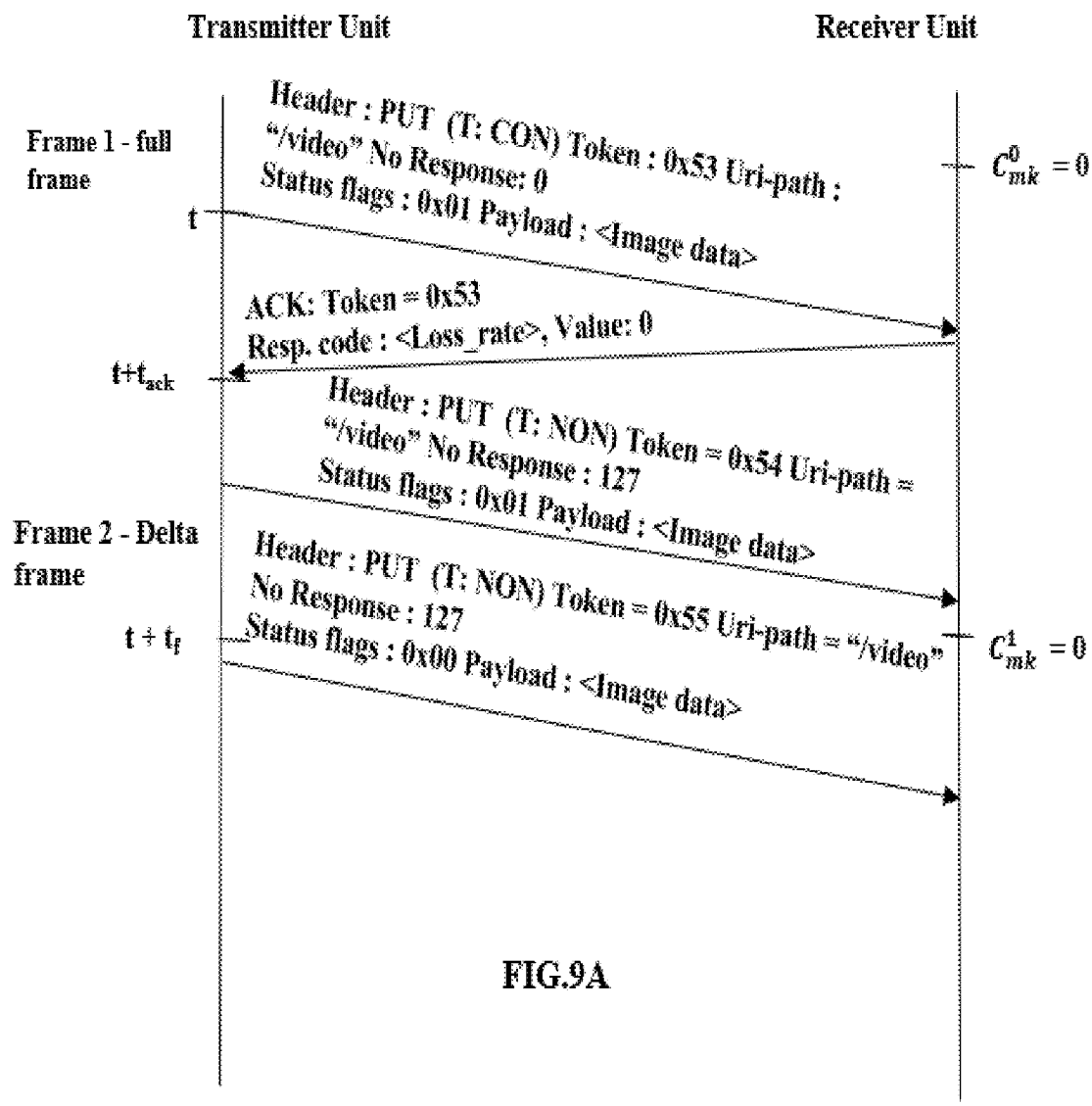
FIG. 9A illustrates an exemplary timing diagram of the associated transmission protocol for lossless transmission using the system of FIG. 1, in accordance with some embodiments of the present disclosure.
Figure 9B:
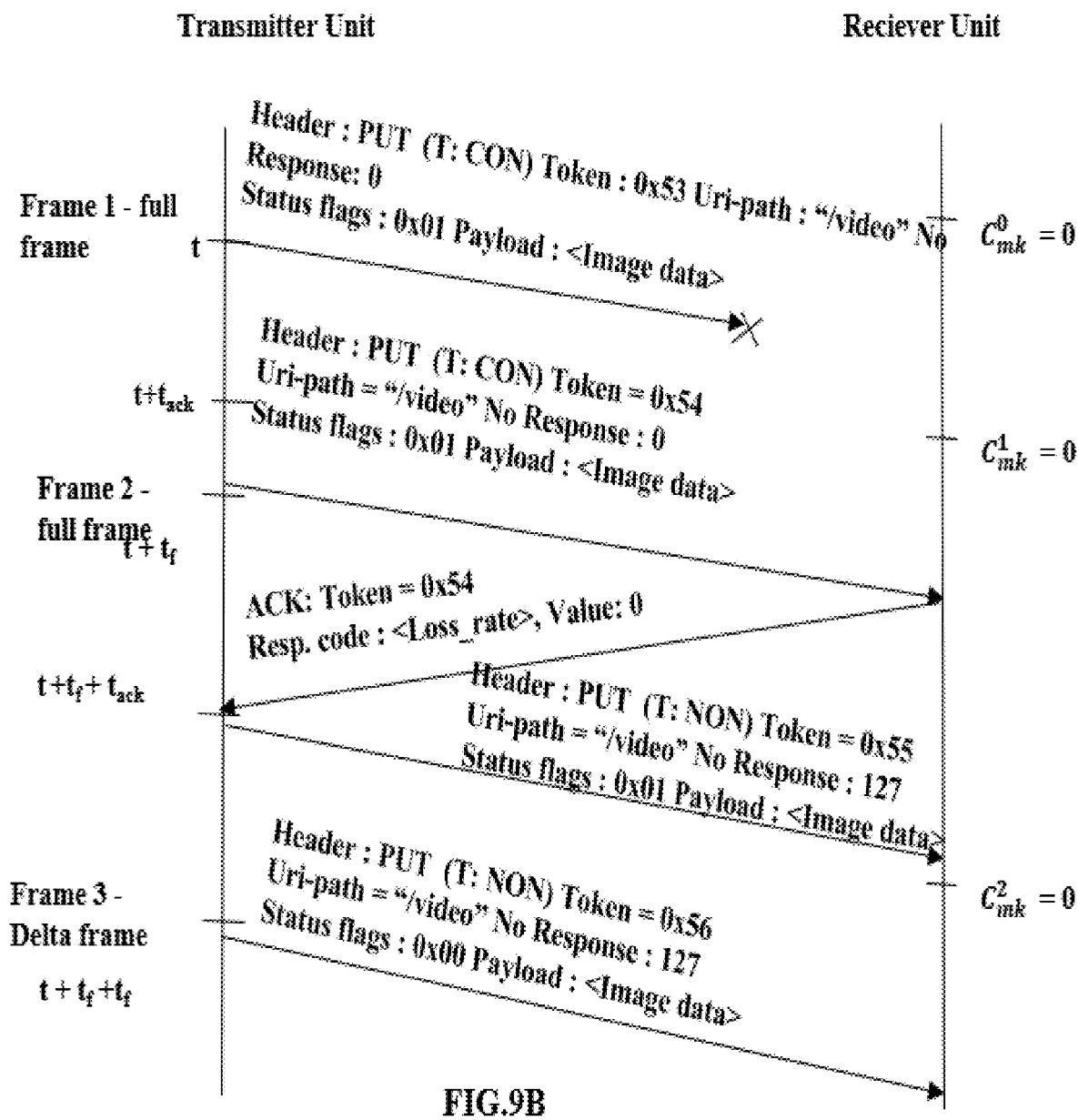
FIG. 9B illustrates a timing diagram an exemplary timing diagram of the associated transmission protocol for lossy transmission causing loss of critical metadata, transmitted with confirmable communication semantics, of delta frame using the system of FIG. 1, in accordance with some embodiments of the present disclosure.
Figure 9C:
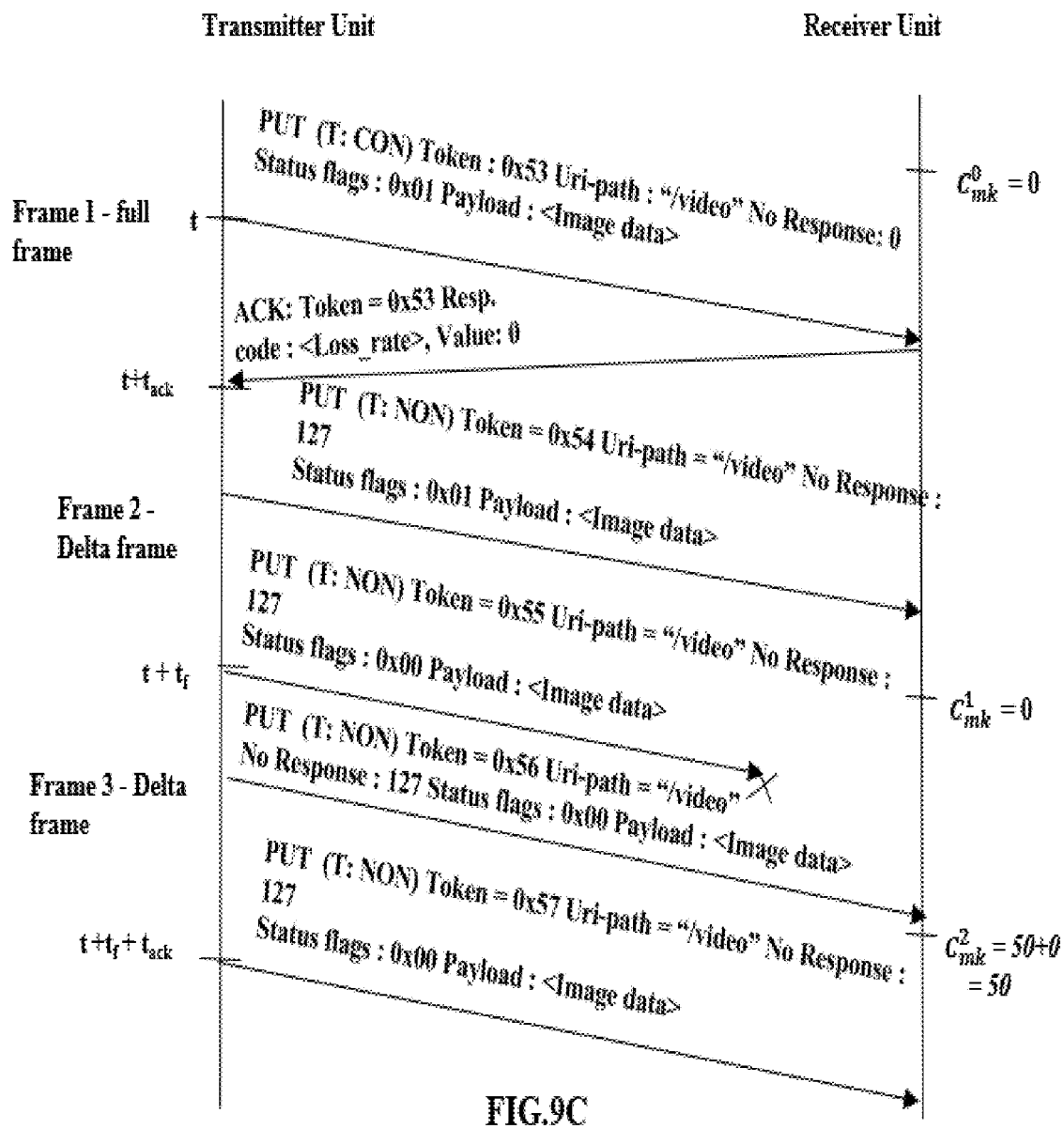
FIG. 9C illustrates a timing diagram for lossy transmission causing loss of first encoded packet of the first delta frame, using the system of FIG. 1, in accordance with some embodiments of the present disclosure.
Figure 9D:
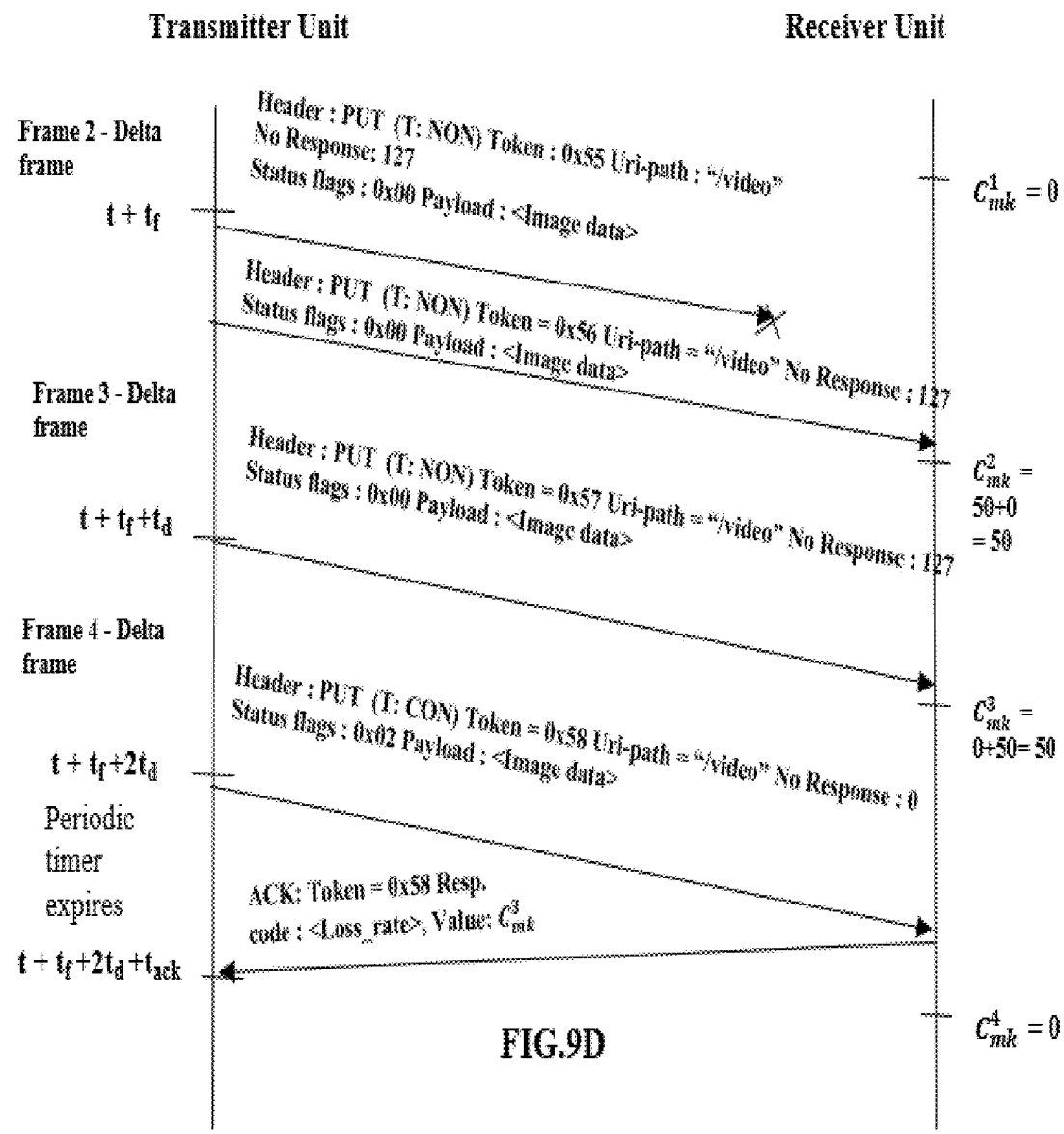
FIG. 9D illustrates the protocol on an expiry of periodic timer under lossy transmission using the system of FIG. 1, in accordance with some embodiments of the present disclosure.

In one embodiment, FIG. 9A illustrates RESTful exchanges under different conditions such as standard semantics of CoAP along with the payload specific header fields for ARV or ARVR. FIG. 9B illustrates exemplary timing diagram of the associated transmission protocol for lossy transmission causing loss of critical metadata, transmitted with confirmable communication semantics, of delta frame. FIG. 9C timing diagram for lossy transmission causing loss of first encoded packet of the first delta frame, and FIG. 9D illustrates the protocol on an expiry of periodic timer under lossy transmission. Since CoAP does not have any provision for granular error feedback reporting. So, a new response (<response code>, <value>) pair representative of $C_{mk}^t$ as below in Equation 3, $$\text{Resp. Code: <Loss\_rate>, Value: } C_{mk}^t, \text{Class:4.xx} \qquad \text{Equation 3}$$

Figure 10:
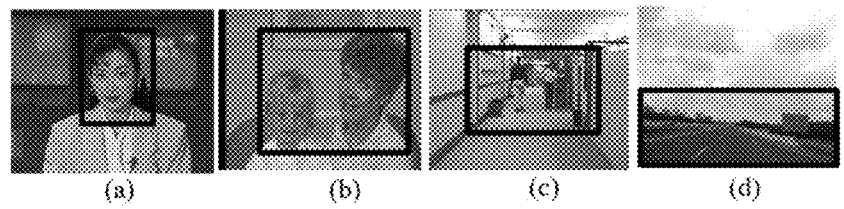
FIG. 10 shows typical examples of region of interest selected in an exemplary frame of a specific video stream being encoded and transmitted using the system of FIG. 1, in accordance with some embodiments of the present disclosure.
Figure 11:
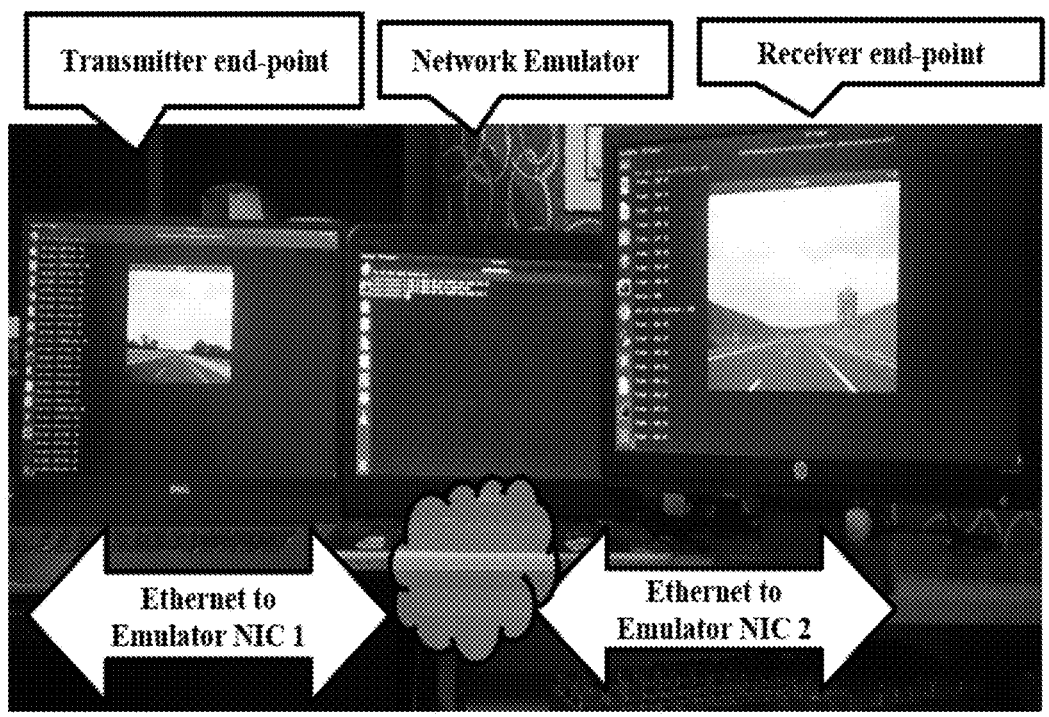
FIG. 11 illustrates an exemplary test setup to emulate a lossy network to test performance of the video streaming system of FIG. 1, in accordance with some embodiments of the present disclosure.

FIG. 10 shows typical examples of region of interest selected in an exemplary frame of a specific video stream being encoded and transmitted using the system of FIG. 1, in accordance with some embodiments of the present disclosure. FIG. 10 represents test video sequences with selected ROI regions such as (a) Akiyo (ROI: The head movement of the news reader, q=0.6, S=4); (b) Mother & Daughter (ROI: Head and finger movement of the mother, q=0.8, S=2); (c) Hall (ROI: From end of corridor to the doors, q=60, S=3), (d) Highway (ROI: The focus of the driver, q=60, S=3). Here q=quality factor used for the ROI region, S=scaling factor between ROI and non-ROI region. ARV/ARVR is implemented on C++ using OpenCV and Boost libraries on Intel Core i5 machines with Ubuntu 18.04. In parallel WebRTC system for comparative study using java script. The WebRTC system is built to stream stored WebM (VP8/VP9 encoded video). Here, standard test video sequences are obtained from For ARVR the ROI zones are selected as illustrated and explained in FIG. 10. In both ARV/ARVR and WebRTC implementations the received videos are stored for full referential measurements. For ARV or ARVR, the set of raw frames are fed to a dummy acquisition unit. For WebRTC the sequences are converted to WebM and fed to the streamer.

Figure 12:
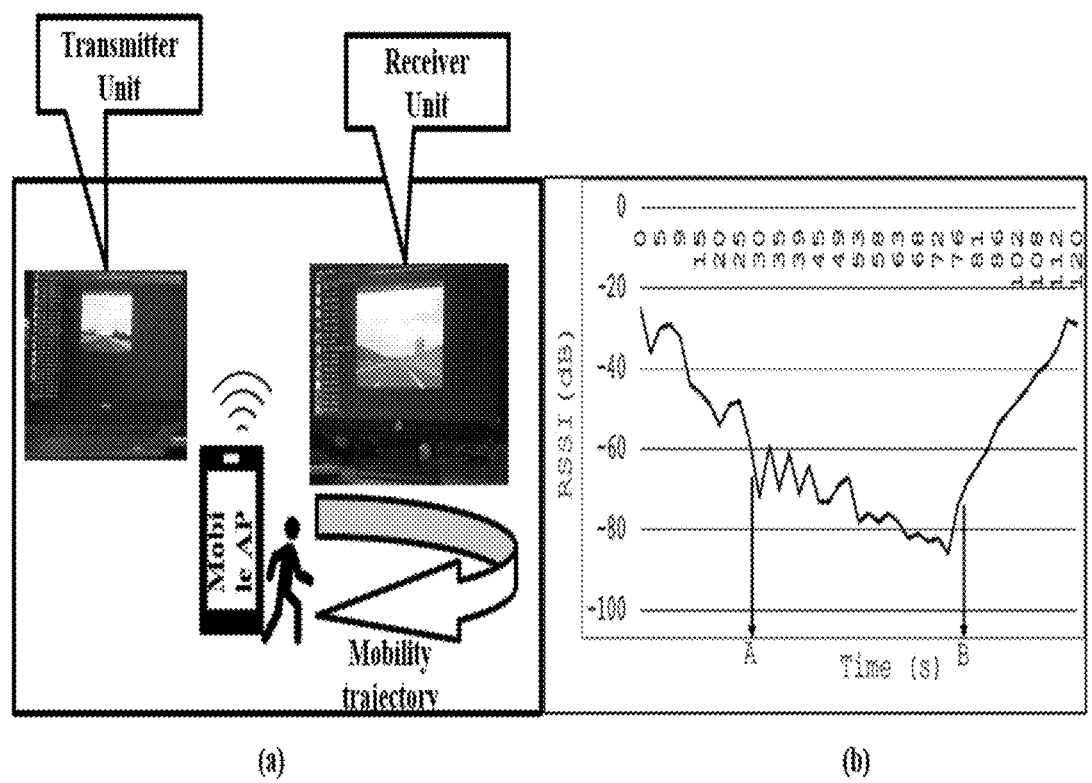
FIG. 12 illustrates an example experimental set up for practical last mile impairment with its resultant received signal strength indicator (RSSI) profile using the video streaming system of FIG. 1, in accordance with some embodiments of the present disclosure.

FIG. 12 illustrates an example experimental set up for practical last mile impairment with its resultant received signal strength indicator (RSSI) profile using the video streaming system of FIG. 1, in accordance with some embodiments of the present disclosure. FIG. 12 represents the performance for the practical last-mile impairment scenarios between ARVR and WebRTC. The transmitter unit and the receiver unit ends are connected over Wi-Fi using a mobile communication device (smart phone) as the access point (AP). The AP is found to be quite conservative for intranet transmission. The average end-to-end RTT observed is 150 ms and the bandwidth is 11 Mbits/s. The access point is moved in a fixed U-shaped trajectory for 120 sec resulting in the RSSI dip-and-lift as shown in FIG. 12. The point A and B indicated in the graph are representative of the points when the WebRTC reception starts to steadily degrade and steadily improves.

Figure 13:
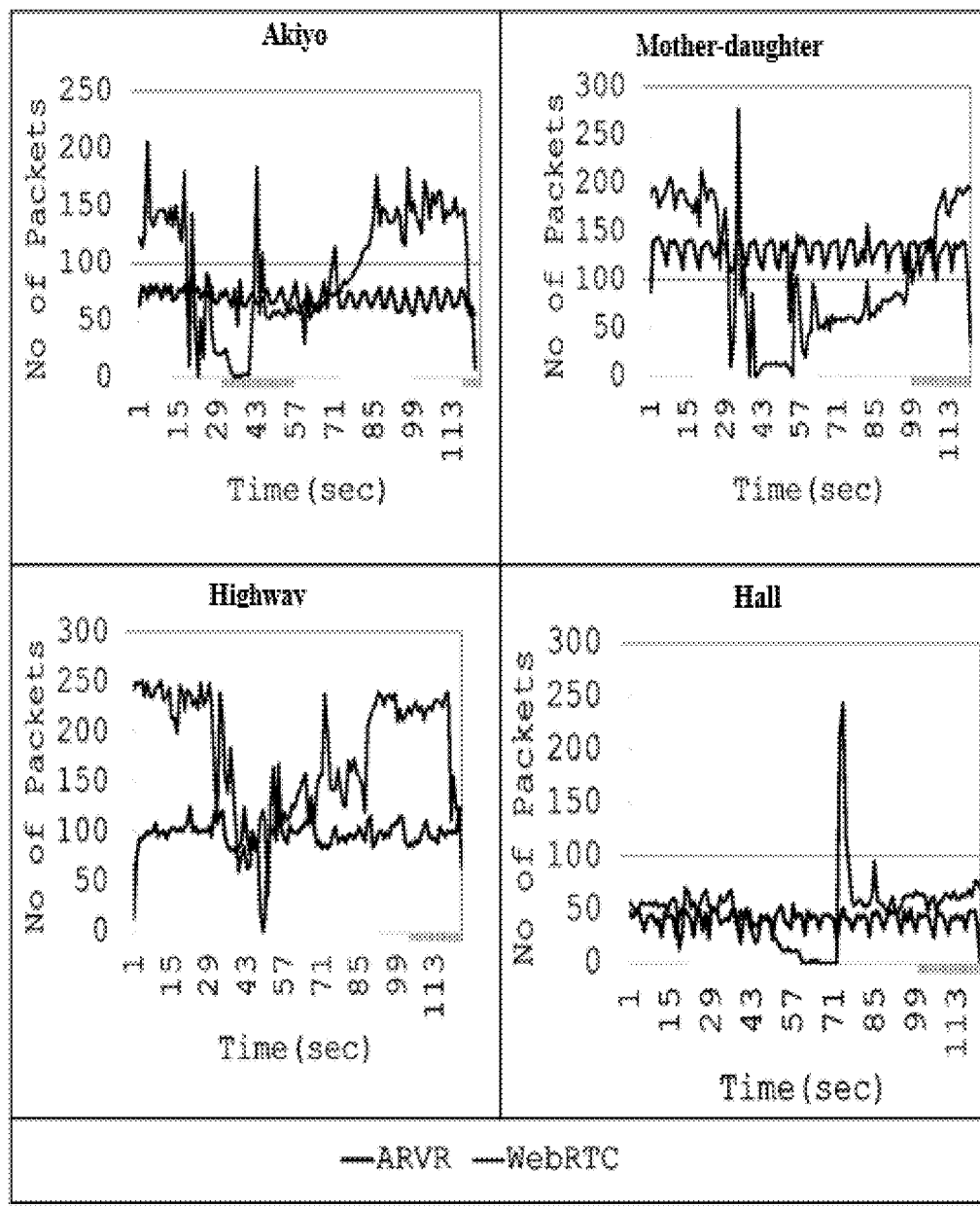
FIG. 13 illustrates an example graphical representation of the packet flow comparison between the adaptive real time streaming for things with improved quality visual background extractor with region of ROI (ARVR) and a web real time communication (WebRTC) based streaming under the test setup of FIG. 12, in accordance with some embodiments of the present disclosure.
Figure 14A:
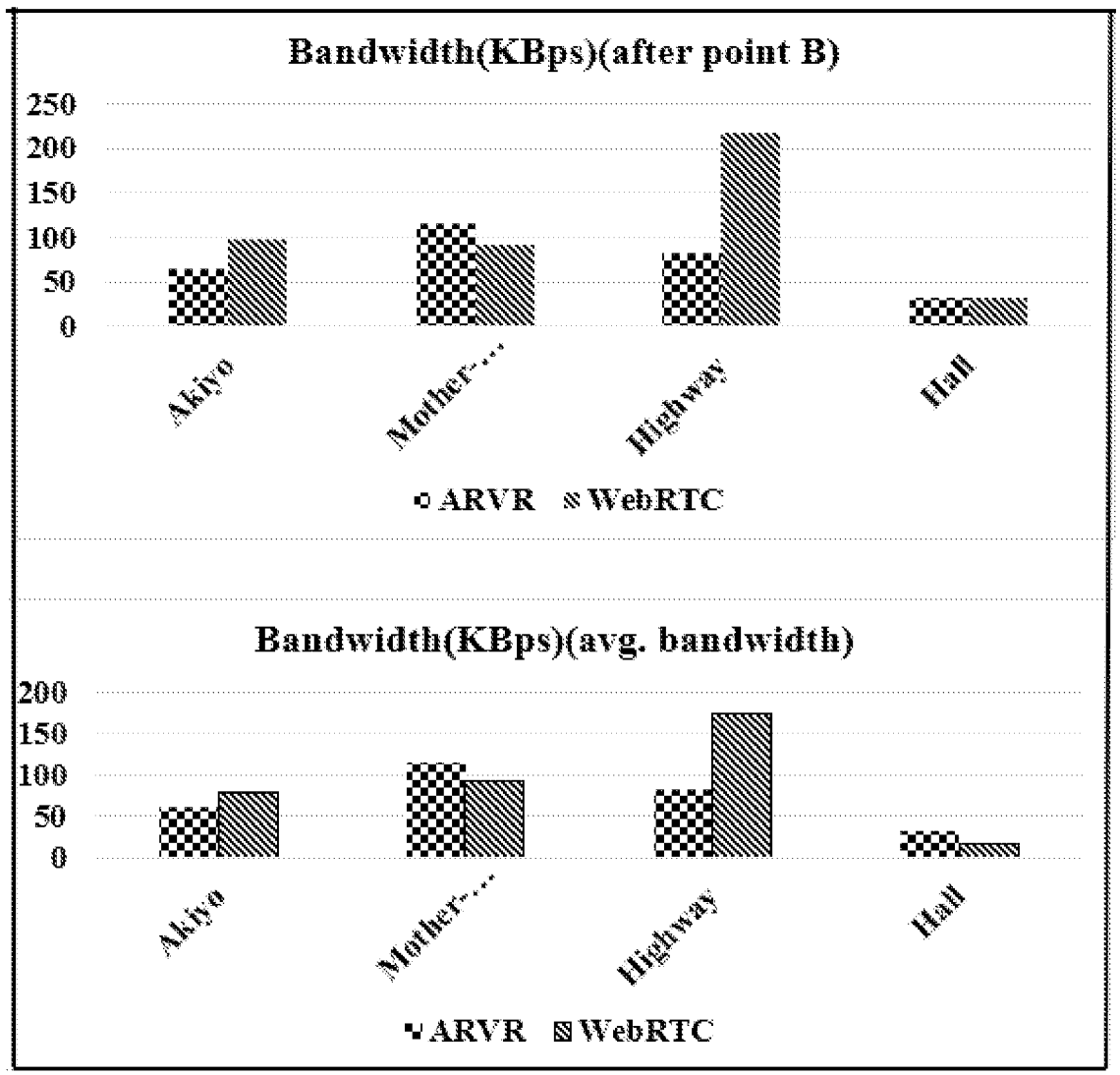
Figure 18A:
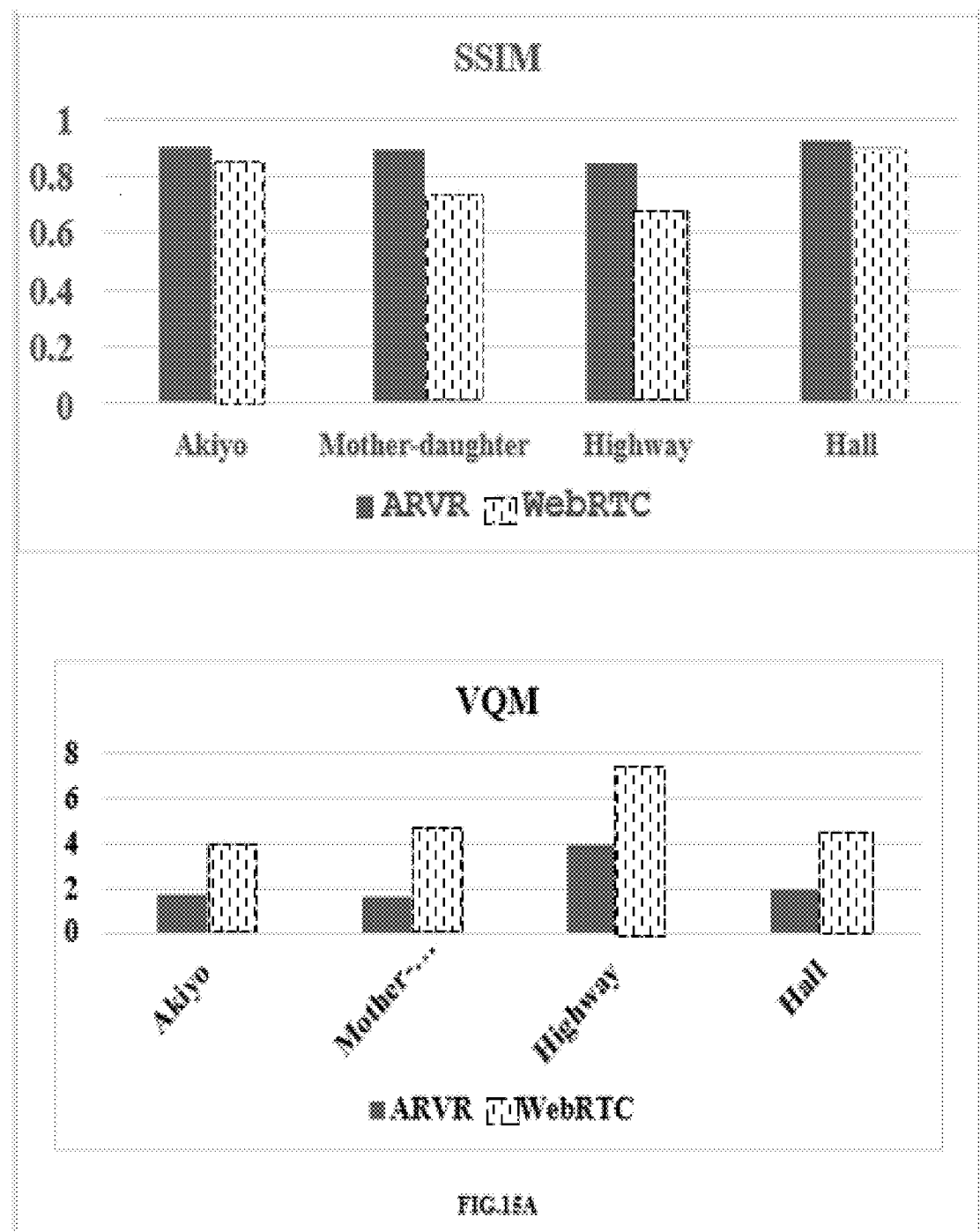

FIG. 13 illustrates an example graphical representation of the packet flow comparison between the ARV with ROI (ARVR) and a web real time communication (WebRTC) based streaming under the test setup of FIG. 12, in accordance with some embodiments of the present disclosure. FIG. 13 depicts resulting I/O graphs show the packet flow for different sequences and the corresponding bandwidth consumption is as depicted in FIG. 13, FIG. 14A and FIG. 14B respectively. The bandwidth comparison is reported in four phases: (i) before point A (as shown in FIG. 12), (ii) in between A and B, (iii) after point B, and (iv) the overall bandwidth.

FIG. 14A and FIG. 14B illustrates an example graphical comparison of bandwidth consumption of streamed video between ARV with ROI and WebRTC using the system of FIG. 1, in accordance with some embodiments of the present disclosure. The packet flow starts from a peak and dips as it approaches the lossy zone and in some cases, there is practically silence. This behavior is also observed in the browser log of the packet loss report and the selective ACKs reported from RTCP. GOP has gone out of sync due to loss of I-frames while, unaware of the application going out-of-sync, the transport is keeping the flow alive until feedback is received from RTCP. On the contrary, the ARVR maintains a nominal flow for the entire duration. Though there are some jittery rendering and momentary freezes (e.g., Highway) but the user experience is maintained. A lot of this owes to the error concealment mechanism of ARV or ARVR (for delta frames) and A-REaLiSTIQ (for full frames). Rather it quickly falls back to the full frame with reduced framerate. This also enables it for quick recovery. On the contrary, in several cases, though the channel has improved, the WebRTC stream is yet to recover the quality. This shows the key problem of lack of synergy between the encoding and transport as mentioned above. Overall, the ARV/ARVR system maintains the quality of experience (QoE) as expected. Also, the delta encoding combined with the ROI based scaling indicates a competitive bandwidth (BW) performance than the WebRTC encoder. In some cases, the overall bandwidth consumption for WebRTC is lesser than ARVR. This is because of rapid reduction in number of packets being delivered and the long silences.

Figure 15B:
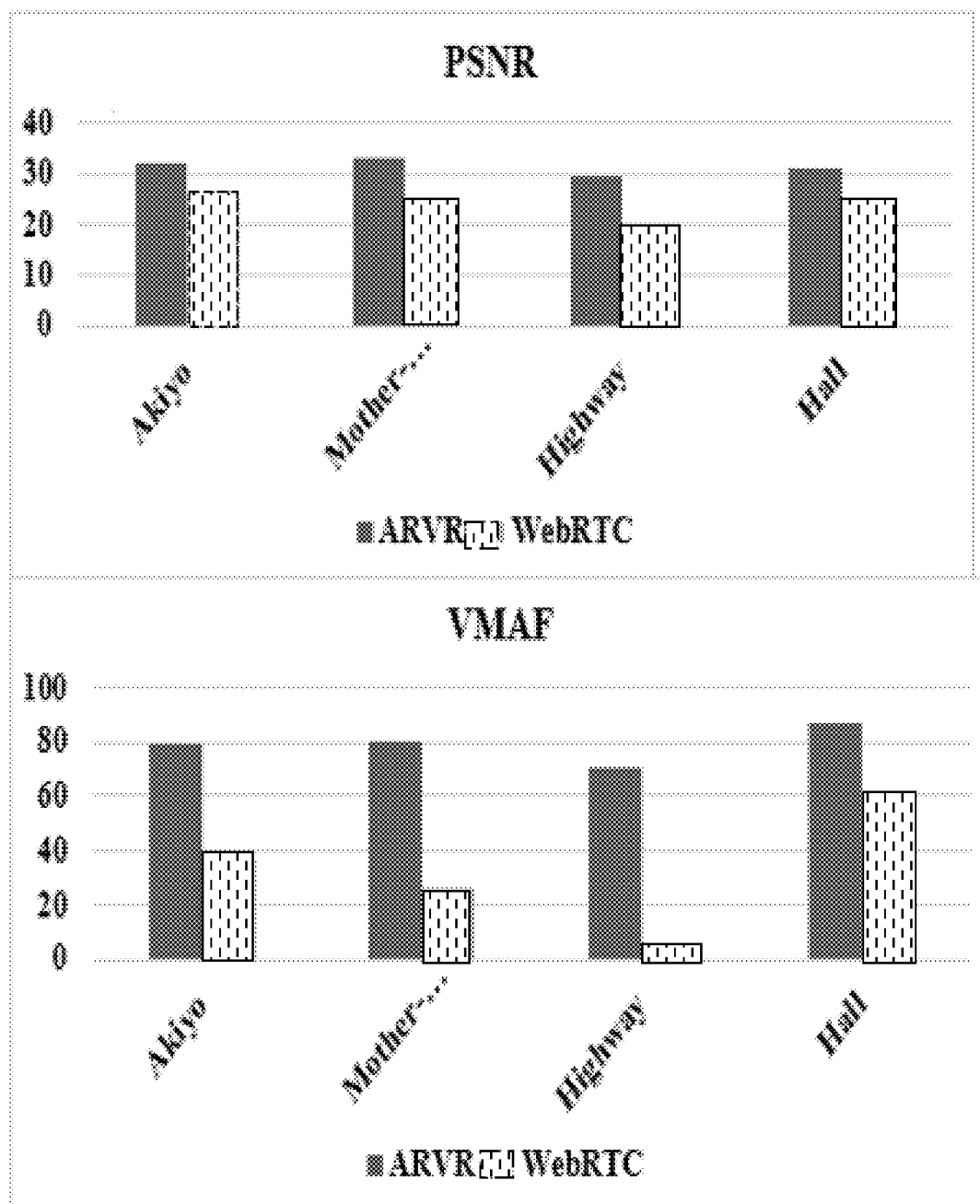
Figure 16A:
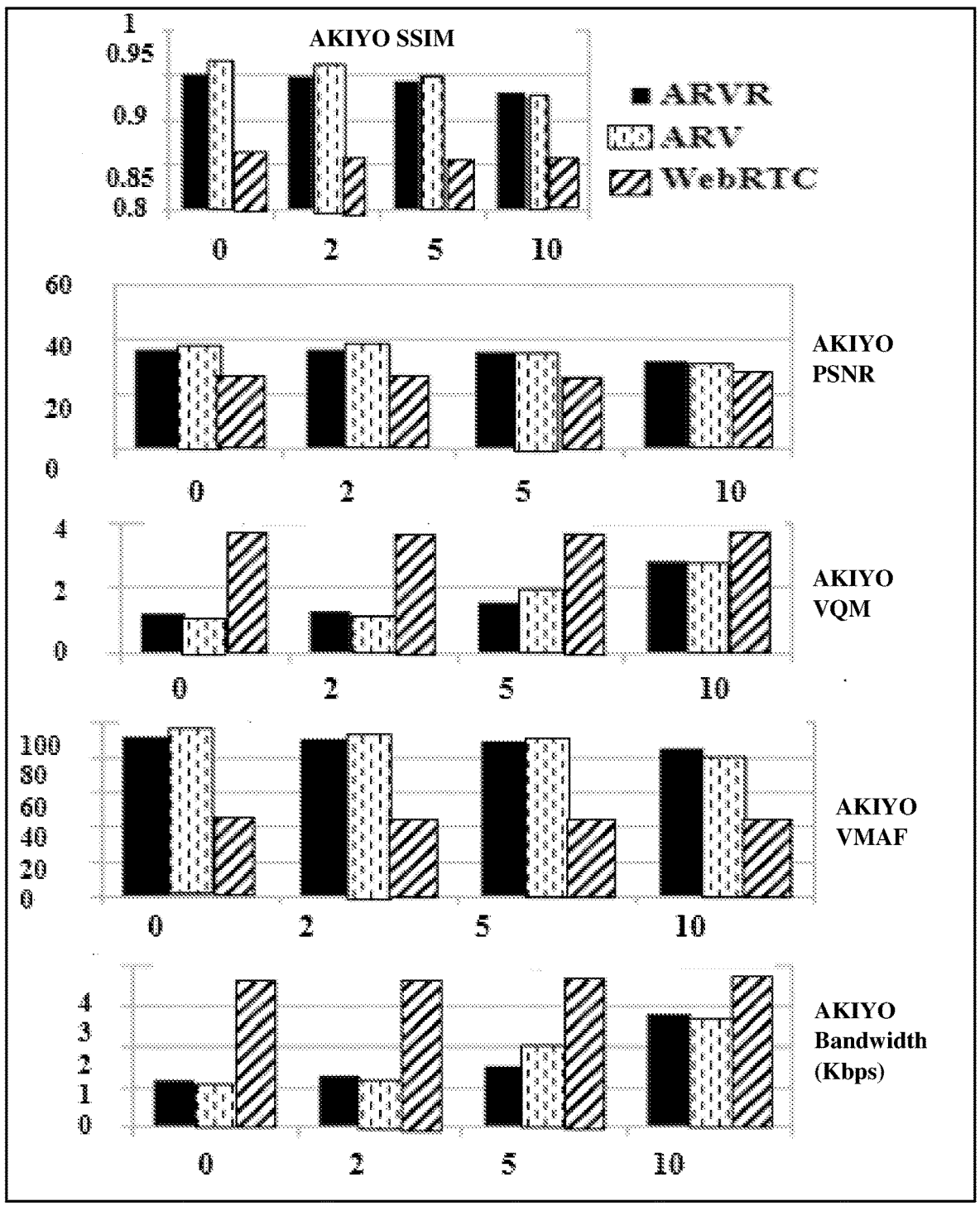
FIG. 16A, FIG. 16B, FIG. 16C and FIG. 16D illustrate an exemplary comparison of full referential visual quality metrics amongst ARVR, ARV, and WebRTC using the system of FIG. 1, in accordance with some embodiments of the present disclosure.
Figure 16B:
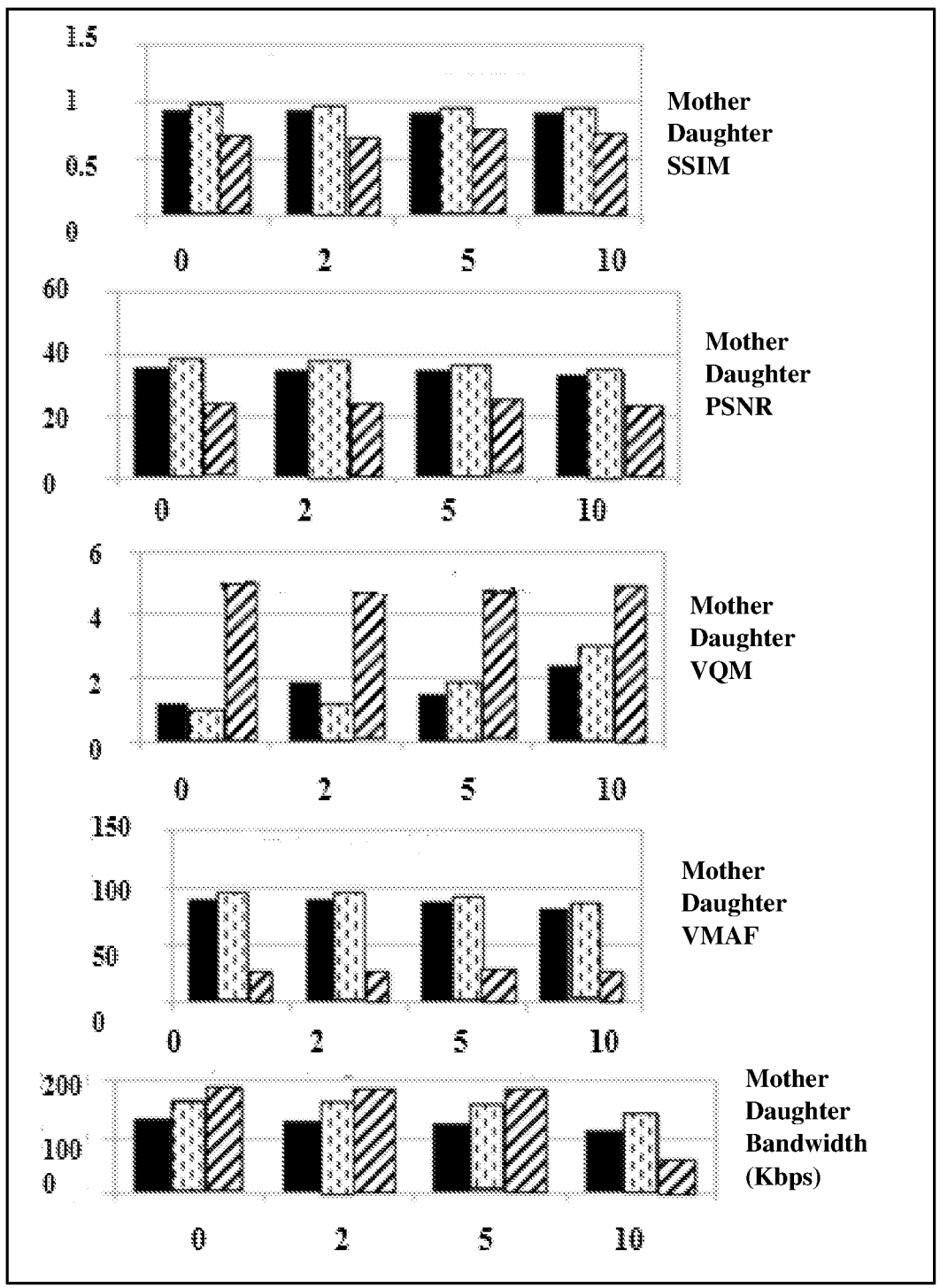
Figure 16C:
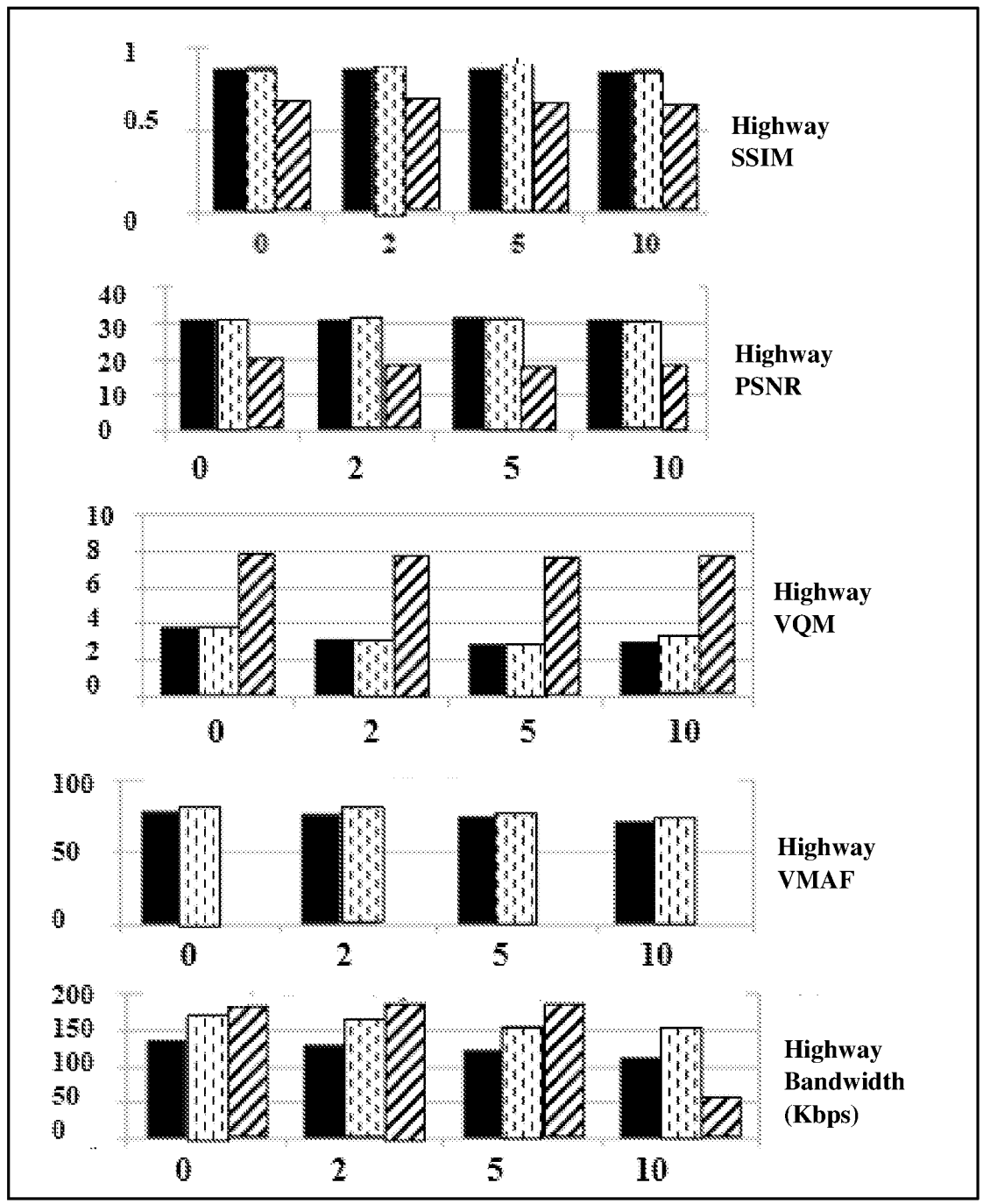
Figure 16D:
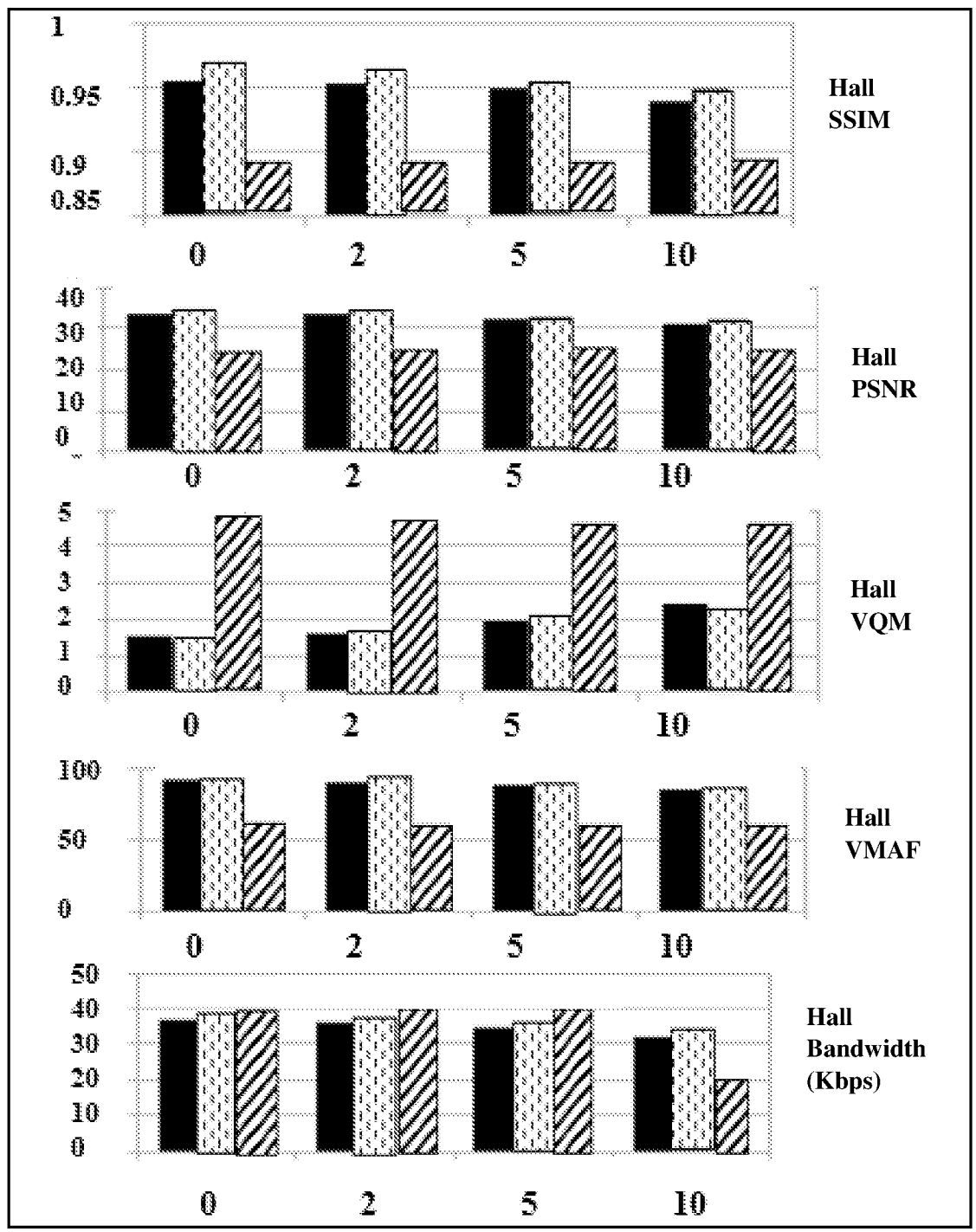

FIG. 15A and FIG. 15B illustrate an exemplary comparison of full referential visual quality metrics between ARV with ROI and WebRTC using the system of FIG. 1, in accordance with some embodiments of the present disclosure. The full referential visual comparisons are shown in FIG. 15A and FIG. 15B are performed in front of fifteen spectators to rate the resultant video for each sequence for experiments with both ARVR and WebRTC. Each rated the visual experience in a scale of 1 to 5 with 1 being the lowest and 5 being the highest experience. It is evident from the visual graphs that, for both subjective and objective measurements, ARVR outperformed WebRTC. This supports visual experience while performing the experiments. In case of WebRTC the receiver unit renders start to degrade much early as the RSSI starts to dip. In the interest of maintaining the bitrate the encoder compresses the video heavily and at times the whole resolution of the video is reduced. In some cases, like Highway sequence, the video freezes for several seconds. These behaviors are testified in FIG. 13.

FIG. 16A, FIG. 16B, FIG. 16C and FIG. 16D illustrate an exemplary comparison of full referential visual quality metrics amongst ARV with ROI, ARV, and WebRTC using the system of FIG. 1, in accordance with some embodiments of the present disclosure. FIG. 16A, FIG. 16B, FIG. 16C and FIG. 16D depicts experimental results of both ARV and ARVR (i.e., without and with ROI scaling) in an emulated environment (FIG. 11) with different controlled loss %. The transmitter unit and the receiver unit through a third computer acting as a gateway. Emulated packet losses at the interfaces of the gateway computer using the NetEm tool (known in the art tool). The results of full referential visual metrics and BW performance (FIG. 11) shows similar visual degradation for WebRTC compared with both ARV and ARVR. Because of bandwidth reduction ARVR has shown better performance but at a reduced visual performance that ARV because of the quality reduction in the non-ROI zones. With increasing loss WebRTC shows a less BW consumption compared to ARV or ARVR for the same reason as above.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of video streaming. The embodiment, thus provides method and system for live video streaming with integrated encoding and transmission semantics. Moreover, the embodiments herein further provides an efficient live streaming protocol tightly coupled with encoding and transmission semantics for original image recovery ensuring resilience. In the realm of video streaming domain owing to reconstructing original image from live video streaming with bandwidth efficiency is restored viably with the method of the present disclosure. Also, there existed no technological intelligence to tightly couple encoding mechanism with transmission semantics. The present disclosure addresses this adequately and brings in the streaming protocol multi tradeoff among real time delivery and visual perception for end user.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for live video streaming with integrated encoding and transmission semantics, comprising:
    encoding, via one or more hardware processors, a set of frames associated with a live video stream of a live video streaming protocol to generate a set of data fragments by using,
    a reference encoder, a set of full frames comprising of encoded MCU (Minimum Coded Unit) blocks corresponding to a complete jpeg frame of the live video stream, and
    a delta encoder, a set of delta frames comprising of encoded MCU blocks corresponding to foreground pixels of a current frame obtained from a background subtraction module;
    periodically transmitting, by using a transmitter unit of the live video streaming protocol via the one or more hardware processors,
        each packet from the set of full frames and each packet from the set of delta frames are transmitted in sequence with a payload specific header based on a packet mode, and
        providing a region of interest (ROI) information to the transmitter unit as pixel boundaries for each packet by computing a scaling factor, wherein each packet of the payload specific header is categorically inferred as at least one of a critical with confirmable communication semantics, and a non-critical with non-confirmable communication semantics; and
    receiving, by using a receiver unit of the live video streaming protocol via the one or more hardware processors, each packet of the full frames and each packet of the delta frames based on the packet mode to reconstruct an original sequence of the live video stream from the foreground pixels, wherein each packet comprising the set of delta frames are decoded using a delta decoder and each packet comprising the set of full frames are decoded using a reference decoder by estimating,
        a total number of packets expected at each frame interval from the payload specific header, and
        a loss incurred in each packet from the set of full frames and the set of delta frames.

2. The processor implemented method as claimed in claim 1, reconstructing the original sequence of the live video stream from the foreground pixels by inserting filler background MCU blocks,
    when a lossless packet identified the filler background MCU blocks are inserted to form the original sequence, and
    when a lossy packet identified lost foreground MCU blocks are identified as the background MCU blocks by inserting filler MCU blocks.

3. The processor implemented method as claimed in claim 1, wherein the packet mode includes a full frame mode and a delta mode, wherein when the delta mode is selected the delta encoder adds zeros in the background pixels of the segmentation map and foreground pixels are JPEG encoded into the MCU blocks.

4. The processor implemented method as claimed in claim 1, further comprising generating a segmentation map for the set of full frames and the set of delta frames.

5. The processor implemented method as claimed in claim 1, wherein the receiver unit computes an instantaneous cumulative error rate at the beginning of each payload specific header interval based on a total number of packet loss, a total number of expected packets and a transmitted payload specific header.

6. The processor implemented method as claimed in claim 1, wherein the delta frames of the foreground pixels are obtained by decoding the received encoded foreground MCU blocks.

7. The processor implemented method as claimed in claim 1, wherein the payload specific header comprises of a status flag, a start MCU index, an end MCU index, one or more padding bits, and a delta DC value of last MCU of a previous packet.

8. The processor implemented method as claimed in claim 1, wherein constructing each packet comprising the set of delta frames by,
    obtaining, the segmentation map and the current delta frame;
    initializing, a packet buffer and a current packet size of delta frame with zeros;
    inserting header meta data information of the current delta frame and the foreground MCU blocks; and
    transmitting, each packet with only foreground MCU blocks based on a maximum transmission unit (MTU) size when, (i) if the sum of current packet size and the total size of the MCU block is greater than MTU size then bits are padded in the current packet and reset the current packet size with zeros, and (ii) if the sum of current packet size and the total size of the MCU block is equal to the MTU size then reset the current packet size with zeros.

9. The processor implemented method as claimed in claim 1, wherein the scaling factor is the ratio of quality between the MCU block with ROI region and beyond non-ROI region.

10. The processor implemented method as claimed in claim 9, wherein the MCU block values in the non-ROI region are scaled down and rounded off with the scaling factor to reduce non-zero MCU blocks to be transmitted without affecting the receiver operation and without informing the receiver unit about the scaling factor.

11. A system for live video streaming with integrated encoding and transmission semantics comprising:
a memory (102) storing instructions;
one or more communication interfaces (106); and
one or more hardware processors (104) coupled to the memory (102) via the one or more communication interfaces (106), wherein the one or more hardware processors (104) are configured by the instructions to:
encode, a set of frames associated with a live video stream of a live video streaming protocol to generate a set of data fragments by using, (i) a reference encoder, a set of full frames comprising of encoded MCU (Minimum Coded Unit) blocks corresponding to a complete jpeg frame of the live video stream, and (ii) a delta encoder, a set of delta frames which consist of encoded MCU blocks corresponding to foreground pixels of a current frame obtained from a background subtraction module;
periodically transmit, by using a transmitter unit of the live video streaming protocol, (i) each packet from the set of full frames and each packet from the set of delta frames are transmitted in sequence with a payload specific header based on a packet mode, and providing a region of interest (ROI) information to the transmitter unit as pixel boundaries for each packet by computing a scaling factor, wherein each packet of the payload specific header is categorically inferred as at least one of a critical with confirmable communication semantics, and a non-critical with non-confirmable communication semantics; and
receive, by using a receiver unit of the live video streaming protocol, each packet of the full frames and each packet of the delta frames based on the packet mode to reconstruct an original sequence of the live video stream from the foreground pixels, wherein each packet comprising the set of delta frames are decoded using a delta decoder and each packet comprising the set of full frames are decoded using a reference decoder by estimating, (i) a total number of packets expected at each frame interval from the payload specific header, and (ii) a loss incurred in each packet from the set of full frames and the set of delta frames.

12. The system as claimed in claim 11, reconstructing the original sequence of the live video stream from the foreground pixels by inserting filler background MCU blocks, when a lossless packet identified the filler background MCU blocks are inserted to form the original sequence, and when a lossy packet identified lost foreground MCU blocks are identified as the background MCU blocks by inserting filler MCU blocks.

13. The system as claimed in claim 11, wherein the packet mode includes a full frame mode and a delta mode, wherein when the delta mode is selected the delta encoder adds zeros in the background pixels of the segmentation map and foreground pixels are JPEG encoded into the MCU blocks.

14. The system as claimed in claim 11, further comprising generating a segmentation map for the set of full frames and the set of delta frames.

15. The system as claimed in claim 11, wherein the receiver unit computes an instantaneous cumulative error rate at the beginning of each payload specific header interval based on a total number of packet loss, a total number of expected packets and a transmitted payload specific header.

16. The system as claimed in claim 11, wherein the payload specific header comprises of a status flag, a start MCU index, an end MCU index, one or more padding bits, and a delta DC value of last MCU of a previous packet.

17. The system as claimed in claim 11, wherein the scaling factor is the ratio of quality between the MCU block with ROI region and beyond non-ROI region.

18. The system as claimed in claim 11, wherein constructing each packet comprising the set of delta frames by,
obtaining, the segmentation map and the current delta frame;
initializing, a packet buffer and a current packet size of delta frame with zeros;
inserting header meta data information of the current delta frame and the foreground MCU blocks; and
transmitting, each packet with only foreground MCU blocks based on a maximum transmission unit (MTU) size when, (i) if the sum of current packet size and the total size of the MCU block is greater than MTU size then bits are padded in the current packet and reset the current packet size with zeros, and (ii) if the sum of current packet size and the total size of the MCU block is equal to the MTU size then reset the current packet size with zeros.

19. One or more non-transitory machine-readable information storage mediums comprising one or more instructions which when executed by one or more hardware processors perform actions comprising:
encoding, a set of frames associated with a live video stream of a live video streaming protocol to generate a set of data fragments by using,
a reference encoder, a set of full frames comprising of encoded MCU (Minimum Coded Unit) blocks corresponding to a complete jpeg frame of the live video stream, and
a delta encoder, a set of delta frames comprising of encoded MCU blocks corresponding to foreground pixels of a current frame obtained from a background subtraction module;
periodically transmitting, by using a transmitter unit of the live video streaming protocol,
each packet from the set of full frames and each packet from the set of delta frames are transmitted in sequence with a payload specific header based on a packet mode, and
providing a region of interest (ROI) information to the transmitter unit as pixel boundaries for each packet by computing a scaling factor, wherein each packet of the payload specific header is categorically inferred as at least one of a critical with confirmable communication semantics, and a non-critical with non-confirmable communication semantics; and
receiving, by using a receiver unit of the live video streaming protocol, each packet of the full frames and each packet of the delta frames based on the packet mode to reconstruct an original sequence of the live video stream from the foreground pixels, wherein each packet comprising the set of delta frames are decoded using a delta decoder and each packet comprising the set of full frames are decoded using a reference decoder by estimating,
- a total number of packets expected at each frame interval from the payload specific header, and
- a loss incurred in each packet from the set of full frames and the set of delta frames.

20. The one or more non-transitory machine-readable information storage mediums of claim 19, reconstructing the original sequence of the live video stream from the foreground pixels by inserting filler background MCU blocks, when a lossless packet identified the filler background MCU blocks are inserted to form the original sequence, and when a lossy packet identified lost foreground MCU blocks are identified as the background MCU blocks by inserting filler MCU blocks.

* * * * *